United States Patent [19]

Farr

[11] 3,895,343
[45] July 15, 1975

[54] APPARATUS FOR PRODUCING ADAPTIVE PILOT SIGNALS

[75] Inventor: John B. Farr, Tulsa, Okla.

[73] Assignee: Amoco Production Company, Tulsa, Okla.

[22] Filed: June 17, 1974

[21] Appl. No.: 479,968

Related U.S. Application Data

[62] Division of Ser. No. 358,187, May 7, 1973.

[52] U.S. Cl............ 340/17; 73/71.5 R; 324/83 FE; 323/106; 340/15.5 TD; 340/15.5 TA
[51] Int. Cl.............................................. G01v 1/14
[58] Field of Search....... 340/15.5 TA, 15.5 TD, 17; 73/71.5, 71.6; 323/101, 106; 324/83 FE

[56] References Cited
UNITED STATES PATENTS

| | | | |
|---|---|---|---|
| 3,416,632 | 12/1968 | Bodine | 340/15.5 TA |
| 3,698,508 | 10/1972 | Landrum | 73/71.5 |
| 3,713,040 | 1/1973 | Page | 324/83 FE |
| 3,761,874 | 9/1973 | Landrum | 340/17 |

Primary Examiner—Maynard R. Wilbur
Assistant Examiner—N. Moskowitz
Attorney, Agent, or Firm—Robert B. Stevenson; Paul F. Hawley

[57] ABSTRACT

A seismic prospecting system where the frequency and duration of vibratory signals are automatically adjusted to compensate for deleterious variations in soil transmissivity which distort the equivalent reflection pulses. The actual signals injected into the earth are monitored by a near-field detector and compared with a predetermined standard. When the energy of one frequency of the injected signal equals the standard, a new frequency signal is computed and injected until it likewise equals the standard. In like manner, frequencies and durations of remaining segments in the vibratory signal are continuously generated until the spectrum of the equivalent reflection pulse closely approximates the standard spectrum chosen to best delineate the geological objective of the seismic survey.

7 Claims, 17 Drawing Figures

ADAPTIVE SET
SIGNAL DURATION REQUIRED TO PRODUCE A
CONSTANT PEAK SPECTRAL VALUE OF 40.5

ADAPTIVE SIGNALS – PRESENT INVENTION

APPARATUS FOR PRODUCING ADAPTIVE PILOT SIGNALS

This is a division of application Ser. No. 358,187, filed May 7, 1973.

BACKGROUND OF THE INVENTION

This invention relates to seismic exploration and more particularly to techniques where wavetrains of vibratory seismic signals are injected into the earth by vibrators or shakers on the earth's surface.

In one type of seismic prospecting, a dynamite explosion is used to generate a sharp seismic pulse at or near the surface of the earth. The seismic waves produced by reflection of this pulse from subterranean elastic interfaces are detected by seismometers spaced at intervals along the earth's surface. Electrical signals from these seismometers are separately amplified and reproducibly recorded on a multichannel field recording apparatus. These recorded signals are subsequently processed and displayed on a multitrace seismogram section. This section is then examined and operated on to pick out reflected and diffracted waves which indicate the positions of subterranean interfaces.

To locate the positions of the reflecting interfaces the two-way traveltime and velocity of the waves must be determined with great accuracy. The accuracy to which the arrival time of any reflection wave can be determined depends on the shape of the seismic reflection pulse as it appears on the seismogram section. It is well known that the seismic pulse is distorted during its passage through the subterranean strata. It is also well known that the elastic properties of the near-surface formations close to the shot have a profound effect on the shape of the seismic pulse injected into the earth. Unconsolidated near-surface materials, such as sand, loamy soils, and marsh deposits, are known to severely attenuate certain seismic frequencies, thereby broadening and distorting the injected seismic pulse and reducing the accuracy with which the twoway traveltimes and velocities can be determined.

Reflected waves from specific geological formations are routinely followed across wide areas and correlated to borehole logs taken from existing wells. The pulse shape corresponding to these specific reflections are in many instances indicative of potential oil reservoirs since they may indicate the presence of a stratigraphic pinchout or other geological phenomenon of interest. When sporadic near-surface materials cause the injected seismic pulse to change shape the reflection pulses will also show this change in shape, leading to uncertainty as to whether the observed change is indicative of a subsurface geological change of interest or merely results from a localized change in the near-surface material.

In a second type of seismic prospecting, a sharp seismic pulse is injected into the earth by a mobile source placed on the surface of the earth. The pulse is produced by exploding mixtures of propane and oxygen, high-energy electrical discharges, releases of high-pressure air, or by large weights dropped onto the earth's surface. As with dynamite, the elastic wave energy generated by these surface sources is injected into the earth at substantially the same time; however, it is very much lower in energy. To achieve adequate signal strength, a large number of such pulses, taken at different surface positions, are summed together in the acquisition process and only a composite pulse recorded for later processing and display.

The same near-surface irregularities which corrupt the seismic pulses generated with dynamite have an even more deleterious effect on the injected pulses obtained with this type of surface source. It is well known that an irregular, low velocity weathering layer exists over most areas from the surface to depths of tens to hundreds of feet below the surface. This weathering layer usually coincides with the aerated soil zone above the water table and has elastic properties which can change very rapidly in short distances. Surface sources are relatively weak in energy when compared to dynamite, therefore a large number of individual pulses must be summed to produce adequate signal strength. Since the sources move across the surface between times of signal generation, each individual pulse is taken at a different surface location with a different near-surface material at each location. The areal distribution of individual source points is required to minimize the very large noises generated by the surface sources. Since many different individual pulses are composited prior to recording, a smeared and distorted composite pulse is produced, which, due to destructive cancellation of the higher frequency components, appears to be very low in frequency and therefore is difficult to time accurately.

In a third method of seismic prospecting an elongated nonrepetitive vibratory signal or wavetrain is injected into the earth, using a number of mobile surface vibrators. Unlike the first two methods where little or no control could be exerted on the injected pulse shape, this method permits limited control of the frequencies in the transmitted signal which, after recording and subsequent processing, determines the shape of the equivalent of the seismic pulse. The injected seismic signal is nonrepetitive or random during a time interval which is at least as long as the traveltime of a reflection wave along the longest travel path of interest. This longest path will usually be the shortest distance from the surface vibrator to the deepest reflecting interface which it is desired to delineate and back to the seismometer at the surface which is furthest removed from the vibrator. In normal practice the vibratory signal is therefore at least as long as the traveltime of the seismic waves to the deepest reflection to be mapped.

The most widely used non-repetitive vibratory signal is one whose frequency changes linearly with the time from some predetermined beginning frequency to a predetermined ending frequency. These beginning and ending frequencies are selected to produce a desired pulse shape after processing, with consideration given to geological objective of the particular geophysical survey, the elastic properties of the intervening geological strata, and the intrinsic mechanical limitations of the mobile vibrators. The signal commonly called a pilot signal may be generated by an apparatus in the vibrator vehicle or taken from a pre-recorded magnetic tape or signal generator in the remote recording apparatus.

The pilot signal is assumed to be a replica of the seismic signal injected into the earth. In reality, it is only a replica of the signal which controls the vibrating apparatus. Two factors tend to distort the injected signal. The first factor is related to the electrohydraulic controls which cause the vibrator to operate. Several large electrohydraulic valves, a hydraulic pump, and mechanical masses are driven during routine operation of the vibrator. Each of these contributes a distortion between the pilot signal and the actual motion of the portion of the vibrator in contact with the earth. These distortions which are functions of the vibrator itself are reduced by feedback control circuitry built into the vibrator control electronics. The second distorting factor is related to the near-surface material upon which the vibrator is operated. This near-surface effect analogous to the one which distorts the pulse generated by the impulsive surface sources, as discussed above.

After reproducibly recording seismic waves arriving at the seismometers and the pilot signal, a later processing step is required to extract the reflection information in an interpretable form. Most commonly, this subsequent step involves cross correlation of the pilot signal with each signal produced by the seismometers. Such cross correlation can be accomplished by an analog correlation apparatus as described by W. E. N. Doty, et al., U.S. Pat. No. 2,688,124, but more commonly a digital computer is used for this purpose. After each seismometer signal has been crosscorrelated with the pilot signal, the time-phase relations yielding the largest correlation values are taken as indicative of the traveltime of the seismic waves from the vibrator location to the reflecting interfaces and back to the seismometer. The shape of the correlation curve determines the accuracy with which the traveltimes of the reflected seismic waves can be determined in the same way as the pulse shape does in the two impulsive methods discussed earlier. When using a sinusoidal pilot signal having a continuously varied frequency so as to be nonrepetitive over its length, the resulting correlation pulses consist of a major lobe flanked by minor lobes diminishing in amplitude and extending in both directions on the time shift axis of the correlation curve. Such a correlation pulse is shown by Crawford et al in U.S. Pat. No. 2,808,577. This correlation pulse differs from the impulsively generated seismic pulse in that the largest amplitude central lobe, which is indicative of the traveltime of the reflected seismic wave, appears in the center of the entire pulse being preceded and followed by extraneous side lobes while the seismic pulse has the larges amplitude at the front end and is followed by minor lobes.

A single seismic trace will commonly exhibit a number of seismic pulses, one following the other, which indicate the presence of a number of reflecting interfaces; likewise, the correlation curve will exhibit a number of correlation pulses, one following the other, which will also indicate the presence of a number of reflecting interfaces. In practice, the correlation curve obtained with this third method is interpreted in the same manner as the seismic trace recorded in the first two methods where impulsive sources are employed.

Just as with the seismic pulses generated with dynamite or surface impulsive sources, the correlation pulses are severely degraded by the action of the near-surface materials upon which the vibrator operates. However, one problem unique to the vibratory method involves the effect of the near-surface material on the side lobes of the correlation pulse. The amplitude of these side lobes is determined by the time rate of change of the transmitted signal. Stated another way, the side lobe amplitude is dependent upon the bandwidth and length of the originally transmitted signal. For two transmitted signals of the same bandwidth, the longer signal will have lower correlations pulse side lobes. If the signals are of the same length, the broader bandwidth signal will produce the lower amplitude side lobes. The most widely used pilot signals are approximately 7 seconds long and have a bandwidth of one to two octaves.

The near-surface geological conditions which degrade the shape of the impulsive signals generated by dynamite restrict the bandwidth of the transmitted vibratory signal, thereby increasing the side lobe amplitude of the correlation pulses. The transmitted signal will not only have a narrower bandwidth than the pilot signal but will also be reduced in effective length, still further increasing the side lobe amplitude. This reduction in effective signal length results from the filtering effect of the near-surface layers. For example, consider a typical 7-sec long pilot signal increasing in frequency from 10 to 40 Hz. If the near-surface soil material filters out all frequencies from 10 to 15 Hz and from 30 to 40 Hz, the original two-octave signal is reduced to the single octave from 15 to 30 Hz. At the same time the original 7-sec pilot signal length has been reduced to 3½-sec transmitted signal length. Since the first 5-Hz portion corresponding to five-thirtieths or one-sixth of the original pilot signal length has been eliminated, and the last 10 Hz corresponding to ten-thirtieths or one-third of the original pilot signal length has been likewise eliminated, it can be seen that only one-half of the total 7-sec pilot signal length has been actually transmitted into the earth.

What makes side lobes such an important source of error in the vibratory method is the probability that the side lobe of the correlation pulse indicative of one strong reflection may be mistaken for the central lobe of the correlation pulse indicate of a nearby weaker reflection. For this reason, it is most desirable to attenuate as much as possible the amplitude of the side lobes of correlation pulses obtained by the vibratory method. A certain minimum side lobe amplitude is inherent when the beginning and ending frequencies are selected and the length of the pilot signal chosen; however, the near-surface materials will in most areas increase these undesirable side lobes manyfold.

A fourth method has been used which also involves the use of vibratory seismic signals, as in method 3. Rather than extended non-repetitive signals, this method employs a number of short monofrequency wavetrains, which are summed or otherwise compressed to produce a pulse similar in appearance to the pulse obtained by cross correlation in the method described above. As taught in the prior art the wavetrains used in this method are truncated sinusoids having constant amplitude and length with frequencies chosen so that each individual wavetrain frequency differs from all other individual wavetrains in the group by the values of an arithmetical series. When all of the different frequency wavetrains are phase aligned about their midpoint and summed, a single pulse is produced if the duration $T$ of each monofrequency truncated sinusoid is the same and the frequencies chosen such that $$\Delta f = \frac{1}{T}$$

where $\Delta f$ is the frequency difference between any two successive sinusoids. The summing procedure is the equivalent of a Fourier synthesis of the particular pulse and the set of truncated sinusoids described by the above equation is called a Fourier set. The shape of the synthesized Fourier pulse is determined by the beginning and ending frequencies in the series, as well as the duration of the sinusoids. The time-bandwidth product will determine the basic pulse shape in the truncated sinusoid method exactly the same way as it does in the elongated non-repetitive signal method.

The Fourier pulse synthesized from a Fourier set covering a given seismic band will have intrinsic side lobes similar to those seen on cross correlation pulses derived from a non-repetitive signal covering the same band. The side lobes of the Fourier pulse will be affected by the near-surface materials in the same manner as the cross correlation pulse side lobes. The amplitude of each individual monofrequency sinusoid is attenuated by the near-surface material, the amount of this attenuation being dependent on the frequency of that particular sinusoid and the transfer function of the near-surface material at that frequency.

Since it is one of the basic limitations in seismic prospecting, the problem of reflection pulse distortion and methods to compensate for it have been the subject of extensive investigation in the prior art. Practically all the prior art has been directed at improvements in the received pulse rather than the injected pulse since with dynamite or other impulsive source, little or no control of injected pulse is possible.

Before discussing the prior art, it is important to distinguish between the known causes of distortion in the received seismic pulse, namely, the near-surface distortions and the travel path distortions. The first type of distortion is caused by the near-surface materials in close proximity to the source of seismic energy. When dynamite is used as a source, the volume immediately adjacent to the shot hole, where breaking and crushing of the material occurs, can be considered as the near-surface region. It is within this near-surface region that inelastic wave propagation occurs. Somewhat beyond this volume of crushed material, the wave propagation becomes the conventional elastic-wave propagation. With surface impulsive sources, a similar nonlinear region exists in the immediate vicinity beneath the area where the impact is applied to the earth's surface.

Surface vibrators, as used in methods 3 and 4 above, may also drive the eath into nonlinearity for a certain small volume beneath the vibrator baseplate. Even though the forces involved in the vibratory methods are much less than in the impulsive methods, such as nonlinear near-surface region is evidenced by the harmonics and other distortions seen on the signal injected into the earth. This near-surface nonlinear volume is much smaller for the low-energy vibratory sources than for the impulsive sources. The much longer time taken to inject the signal greatly reduces the instantaneous forces on the ground surface. It is precisely this small volume of near-surface material that creates the severe problem encountered in the vibratory methods. Since only a small volume is involved, very localized changes in surface soils may drastically alter the injected signal. On the other hand, when dynamite is used as a source, a relatively large volume of material lies within the near-surface region, thereby averaging out small localized variations.

The second type of signal distortion occurs as the result of passage of the seismic waves through the many different types of geological strata from the source to a reflecting interface and back to the seismometer. A progressive attenuation of high frequencies in the seismic pulse is observed for pulses that have traveled deeper and deeper into the earth. This attenuation occurs although the material is entirely elastic. It has been atributed to scattering and absorption and is generally termed inelastic attenuation. In addition to inelastic attenuation, there is a second earth-filtering effect which results from the seismic wave reflections from a multitude of very closely spaced reflection interfaces. A large number of multiple reflections can be created under certain geological circumstances. These multiples destructively interfere with each other, severely attenuating the higher seismic frequencies in certain areas.

PRIOR ART

Prior art has dealt almost exclusively with the near-surface and transmission distortions as a single problem. I separate the two and my invention is designed primarily to eliminate or greatly reduce the highly variable near-surface distortion.

The vibratory method using elongated non-repetitive signals is best described by Crawford et al. in U.S. Pat. No. 2,989,726. The same inventors in U.S. Pat. No. 2,808,577 recognized the distorting effect on the correlation pulse caused by the propagating medium due to unequal attenuation of different frequencies, and suggest several methods of alleviating the problem. They call for an intensifying effect on portions of the elongated non-repetitive transmitted signal, to equalize the different frequency contributions to the correlation pulse. This intensifying effect may be accomplished in several ways. The single nonrepetitive signal may be broken into two non-repetitive signals and the one containing the frequencies most attenuated by traveling through the earth and back to the surface being transmitted for a relatively longer period of time. The attenuated frequency components may be transmitted at a higher vibrator amplitude level. The same attenuated frequency components may be selectively amplified on either the received or pilot signals prior to cross correlation. Or, conversely, selective attenuation may be applied to the non-attenuated frequency components of either received or pilot signals prior to cross correlation. Regardless of which method is employed, the received an pilot signals are subsequently cross correlated to produce the final correlograms.

The frequencies to be intensified are determined by originally transmitting a predetermined non-repetitive signal, recording the signals received at the seismometer, cross correlating the signals and then discovering what frequency variations are missing in the correlation curve. Since the signals received at the seismometer contain distortions introduced by inelastic attentuation and multiple reflections from thin beds, this procedure of necessity treats the travel path distortions and the near-surface distortions as one single problem. Also, since the deficient frequencies are determined after cross correlation, the corrupting effect of the side lobes from strong reflection events may dominate the correlogram, thereby lending to erroneous conclusions regarding which frequencies are to be intensified.

Cunningham in U.S. Pat. No. 3,289, 154, describes a psuedo-random signal formed according to a binary code group of maximal length, which is substantially longer than the longest traveltime of interest. This signal is designed to have a predetermined frequency spectrum. He also treats the problem of the change of amplitude, the frequency distribution, as the seismic signal is transmitted through the earth. By use of a variable frequency hetrodyne meter, he measures the frequency spectrum of the compressed wavetrain, and then keeps repeating this process with different pseudo-random wavetrains of different known frequency spectra until a desired received signal spectrum is obtained. As in the Crawford et al. method, an elongated signal is used and changes made in this signal according to the frequency spectrum of the received data.

The vibratory method employing truncated monofrequency sinusoids is described by McCollum in U.S. Pat. No. 3,182,743. These sinusoids, unlike the elongated signals used by Crawford et al., are short in duration. They have lengths of less than one-tenth of a second, as compared to the seven or more seconds used in the Crawford et al. method. As taught by McCollum, the individual sinusoids are algebraically summed to produce a Fourier pulse, which is used in the same manner as the correlation pulse to determine the traveltime of the seismic waves reflected by the subterranean geological interfaces. McCollum recognizes the distortion problem and in a later patent, U.S. Pat. No. 3,274,544, teaches a method of improving the distorted Fourier pulse shape by an arrangement of playback heads wired to give the fist derivative of the combined waveforms. By such an arrangement, a somewhat sharper pulse is produced, thereby reducing sidelobe distortion.

Mifsud in U.S. Pat. No. 3,259,878 also transmits narrow bandwidth seismic waveforms, each having a different center frequency, and then combines these waveforms to form a composite reflected signal having a selected frequency spectrum. Mifsud recognized the deleterious effect of a change in vibrator coupling due to differences in elastic properties of the earth from one place to another, or due to a change in the area or configuration of contact between the vibrator and the earth material. However, in this correction procedure the desired frequency spectrum is determined by visually observing the composited signal pulse on the face of an oscilloscope and separately delaying and amplifying the individual sinusoidal signals until a sharp pulse was obtained. Presumably, this is done once for a given prospect area, since such a manual adjustment at each vibrator point would be so slow as to make the procedure impractical.

Ruehle in U.S. Pat. No. 3,274,542 treats the distortions produced by the near-surface region and teaches a method of producing improved seismograms by equalizing the respective Fourier frequency components across the desired seismic band. Ruehle's procedure essentially involves determining an inverse transfer-function which, when applied to the particular seismic trace or record, change its characteristics to some desired standard, or to some other seismic trace or record. He determined the amplitude and phase of the Fourier components of a first signal, then compared these with the amplitude and phases of a desired reference signal. Using this comparison, he derived a correction signal in the frequency domain, having an amplitude as a function of frequency, which is the quotient of the first and reference signal amplitudes, and a phase as a function of frequency, which is the difference of the phases of the first and reference signals. This correction signal was then transformed into the time domain and used to modify the received signals. Since Ruehle was using impulsive sources, the fist signal spectrum was entirely determined by the near-surface material at the moment the shot is detonated. Consequently, the only remedial action that could be taken by Ruehle occurred after the data has been recorded, where the reflection signal produced by the shot was already deficient in certain desired frequencies due to near-surface soil conditions. These frequencies could only be increased in amplitude after the data had been recorded.

Seismic noises, that is extraneous events from wind, surface waves, ground unrest, etc., are common at practically all frequencies across the seismic band. These seismic noises are recorded simultaneously with the reflection signals arriving at the seismomters. If the original injected signal, the shot in this case, is deficient in certain frequencies, the signal-to-noise ratio at these specific frequencies will be very low. If later enhancement of these frequencies is performed on the originally recorded data, the noises and the signal will be equally increased, and result in a record which is very noisy. Since the signal and noise are not separable on the conventional seismometer signal recordings, the harmonic analysis procedure used by Ruehle will produce a signal spectrum which will depend partially on the amount of reflection signal and partially on the amount of noise present. Where the shot is deficient in certain frequencies is precisely where the noise frequencies will predominate and hence create an error in the analytical procedure.

The vibratory methods have the unique advantage over the impulsive methods in that the injected signals are subject to control. Not only can the exact bandwidth be determined by selection of the beginning and ending frequencies, but also their exact signal spectrum can be predetermined. There is a second advantage to the vibratory method which has not been used in the prior art. This advantage consists of the ability to alter the length of time required to inject the signal. In the elongated non-reptetitive signal method, the shortest time required to inject the signal is that equal to the two-wave traveltime to the deepest reflecting interface of interest. This is usually a minimum of three and a maximum of seven seconds. In the Fourier synthesis method, a large number of one to one-tenth second truncated sinusoids or wave packets are injected into the earth. The injection time for a dynamite pulse is extremely short, at best the order of one-hundreth of a second. Th relatively longer time available in the vibratory methods permits spectrum shaping of the injected signal in real time, thereby permitting control of the resultant reflection pulse shape.

By adapting the signal driving the vibrator to the localized near-surface conditons existing at each separate vibrator point, a uniform injected signal can be produced regardless of the near-surface lighological variations. This uniform signal will provide the best possible signal-to-noise ratio at each frequency across the seismic band of interest, thereby improving the correlation or Fourier pulse shape, and hence the accuracy with which the traveltimes to the reflecting interfaces can be determined.

My invention improves the vibratory seismic methods by using real time feedback control of injected signals to produce uniform or specified amplitudes for selected frequencies acorss a predetermined seismic band regardless of changes in the near-surface materials. By eliminating the distorting effects of the near-surface material, reflecton pulses are produced which are truly representative of the subterranean geological strata, thereby permitting inferences as to the possible location of oil traps in stratigraphic pinchouts or in other geological phenomena, which are detectable by changes in the reflection-pulse shape.

The correlation or Fourier pulse produced in the vibratory methods will have the smallest amplitude side lobes for a given bandwidth and a signal length when, by use of my invention, all frequencies of the transmitted signal are injected into the earth with at least approximately equal energies. Such reduction of side lobe amplitudes lessens the tendency of strong reflection pulse side lobes to override or obscure the central pulse from weaker nearby reflections.

Finally, my invention improves the accuracy with which the two-way traveltime to a given reflecting interface can be determined. This results from increasing the amplitude of the high-frequency components in the reflected signal. The prior-art vibratory methods all suffer from the loss of high-frequency portions of the injected signal due to the severe filtering effects of the soil immediately below the vibrator. By using my invention, the heretofore attenuated high frequencies can be injected with the same energy as the more easily transmitted lower seismic frequencies. Since it is primarily responsible for the sharpness of the correlation of Fourier pulses indicating the presence of a reflection on the correlogram, the added high-frequency energy permits improved timing of the reflection events.

SUMMARY OF THE INVENTION

My invention permits a surface vibrator to inject vibratory signals having predetermined amplitude-frequency sepctra into the earth regardless of variations in the near-surface materials in the immediate vicinity of the vibrator. I accomplish this by combining a programmable signal generator probably located in the vibrator vehicle with an energy-sensing and comparing apparatus connected to an injected signal detector.

At each individual vibrator location, the frequencies which are attenuated by the soil or other material upon which the vibrator operates are detected and compared to a predetermined standard. When any particular frequency is found to have less energy than the standard requires, the signal being produced by the signal generator is modified to correct this deficiency. This modification can take several forms. One is to increase the force level of the vibrator, thereby increasing the amplitude of the deficient portion of the outgoing signal. In practice, this signal modification is usually not relatively useful, because most vibrators are routinely driven at or near the maximum force level. A further increase in force level, if required to compensate for a particular deficient frequency, may cause the vibrator to become decoupled from the ground. In other words, the vibrator baseplate would jump off the ground if a greater force level were required. The amplitude of a particular deficient frequency can always be increased by later transmitting an additional signal at this deficient frequency and summing the two recordings.

A second way of increasing the energy level of the particular deficient frequency is to increast the time that that frequency is transmitted. The beginning frequency is transmitted until the energy of that frequency reaches the predetermined standard level. Then a second frequency is tansmitted until its energy reaches the predetermined level. Then each subsequent frequency is transmitted for the length of time required to reach the standard level until all required frequencies have been transmitted. These signals can be separately transmitted, received, and reproducibly recorded as a series of relatively short truncated sinusoids as in the Fourier synthesis methods, or can be transmitted sequentially to form an elongated signal which, although repetitive in part, has a duration at least as long as the traveltime of the seismic waves to reach the deepest reflection of interest.

A third way of increasing the energy level of a particular deficient frequency is to modify the frequency increment between successive monofrequency portions of the transmitted signal in the Fourier synthesis method or to modify the incremental change of frequency with time in the elongated signal method. Where a pulse is produced by Fourier synthesis, a certain minimum number of monofrequency signals having a frequency increment $\Delta f$ between each signal is required to cover a predetermined bandwidth. If more than the required number of signals is transmitted, thereby reducing the increment $\Delta f$, below $\Delta f = 1/T$ required by the Fourier criteria, additional energy is contributed to the overall signal at the frequencies where the $\Delta f$ increment has been reduced.

DETAILED DESCRIPTION OF THE PREFERRED EMBODIMENT

Figure 1:
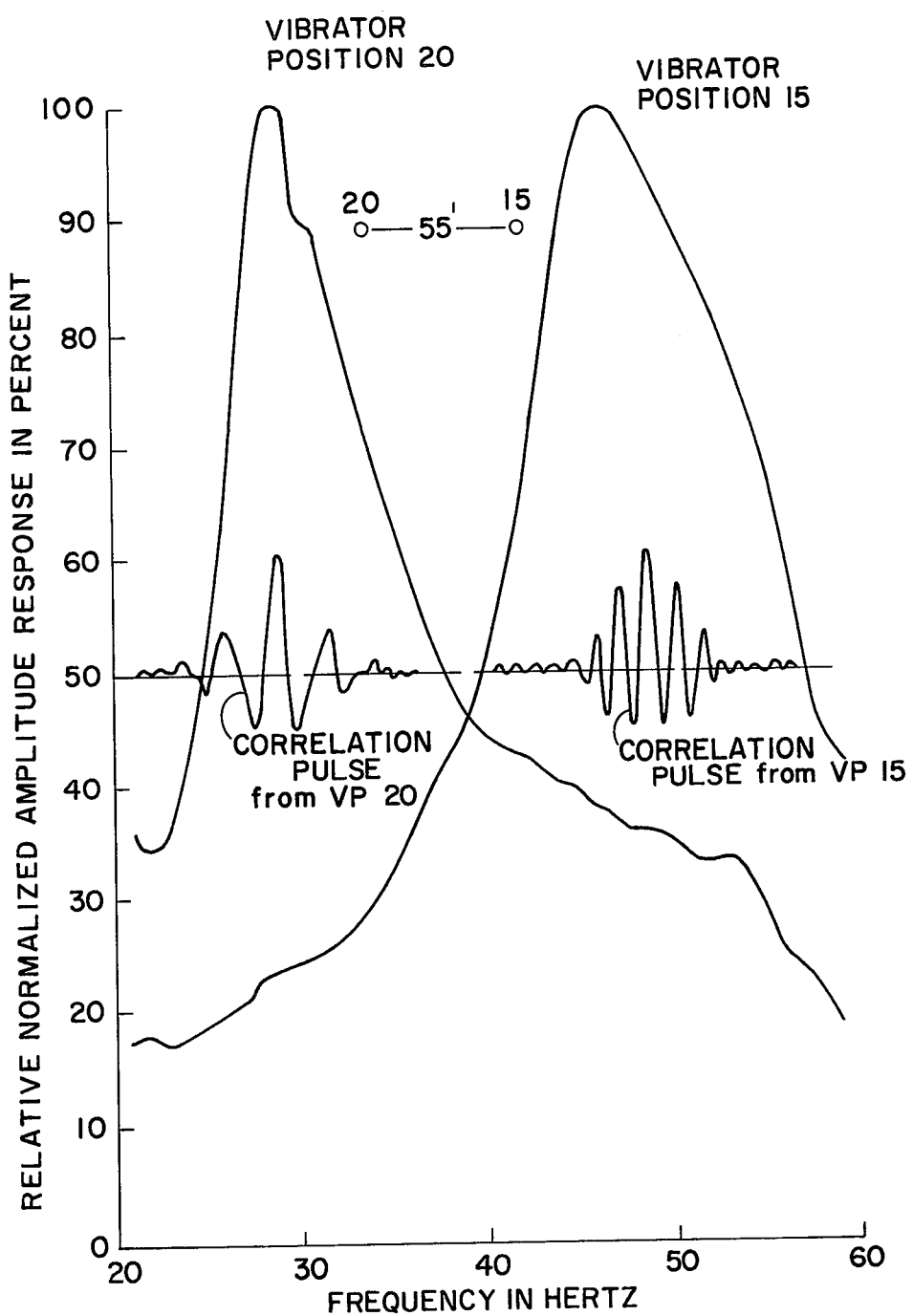
FIG. 1 graphically illustrates the effect of near-surface soil materials on the amplitude-frequency characteristics of the signals injected into the earth by a surface vibrator at two closely spaced stations.

Attention is now directed to FIG. 1, where two smoothed amplitude-frequency response curves are compared, illustrating the extreme variability of the near-surface soil materials over very short surface distances. Both curves were obtained using elongated non-repetitive constant amplitude vibrator pilot signals having a linear change in frequency from 20 to 58 Hz in a time of approximately 7 seconds. The amplitudes of the actual ground motion were determined from signals generated by a near-field detector adjacent to the vibrator position. The two vibration points were only 55 feet apart, illustrating the localized nature of the near-surface distortions.

In the area where the data shown in FIG. 1 was taken, the near-surface region must be less than 55 feet in areal dimension. The near-surface region is commonly but not always limited to a hemisphere centered on the surface vibrator having a radius equal to the depth of the weathering layer. As discussed above, the weathering layer usually coincides with the aerated soil zone above the ground water table. In certain water-covered areas, such as marshes, swamps, etc., this layer may extend to arbitrary depths beneath the surface.

The signal from a near-field detector located within the near-surface region will essentially consist of the radiated seismic signal. It is recognized that unusual geological conditions may give rise to near-surface acoustical interfaces which contribute extraneous reflections to the near-field signal. When this occurs, the radiated seismic signal is modified by these same extraneous reflections and consequently they are properly included with the signal directly from the vibrator.

I prefer to use a near-field detector located close to the vibrator; however, due to the relatively high force levels and large ground motions, special detectors are required. In many field areas, I have found the near-field region extends a sufficient distance from the vibrator that conventional seismometers may be employed as near-field detectors without damage.

Using special detectors suitably ruggedized to withstand the high force levels, I have found in many areas the near-field detector may be affixed directly to the vibrator baseplate and provide an excellent replica of the radiated seismic signal.

Where surface geological conditions distort the radiated seismic signal, it may be desirable to locate the near-field detector in a deep borehole beneath the distorting zone which on occasion may extend to depths well beneath the surface weathering layer.

It is apparent on FIG. 1 at both vibrator positions 15 and 20 a much narrower bandwidth signal was transmitted into the earth than the desired 20 to 58 Hz chosen for the seismic objectives in the area. Where the desired pilot signal was approximately 1½ octaves wide, each of the two signals actually injected into the earth at positions 15 and 20 were barely one-half octave wide at the 50% amplitude points. The lower portion of FIG. 1 shows the correlation of pilot signal with earth signal. It is to be remembered that the resulting correlation pulses are used to locate and time the subsurface reflections. These have side lobe amplitudes approximately inversely proportional to the bandwidth of the injected signal. Correlation pulses obtained from signals injected at positions 15 and 20 have very high amplitude side lobes, making interpretation difficult, particularly where closely spaced geological strata are to be resolved.

In addition to the high side lobes, the correlation pulse breadths shown in FIG. 1 differ substantially. Pulse breadth is defined as the time between first zero crossings on each side of the maximum correlation lobe. Pulse breadth is dependent on the beginning and ending frequencies of the signal transmitted through the earth. Since the two signals have different effective beginning and ending frequencies, the pulse breadths reflect this difference. Changes in side lobe amplitudes and pulse breadths due to the near-surface conditions can together be considered as distortions in pulse shape. When different shape pulses are summed, the resulting pulse is at best a poor substitute for the desired pulse chosen to best delineate the geological objectives of the seismic survey.

Figure 2:
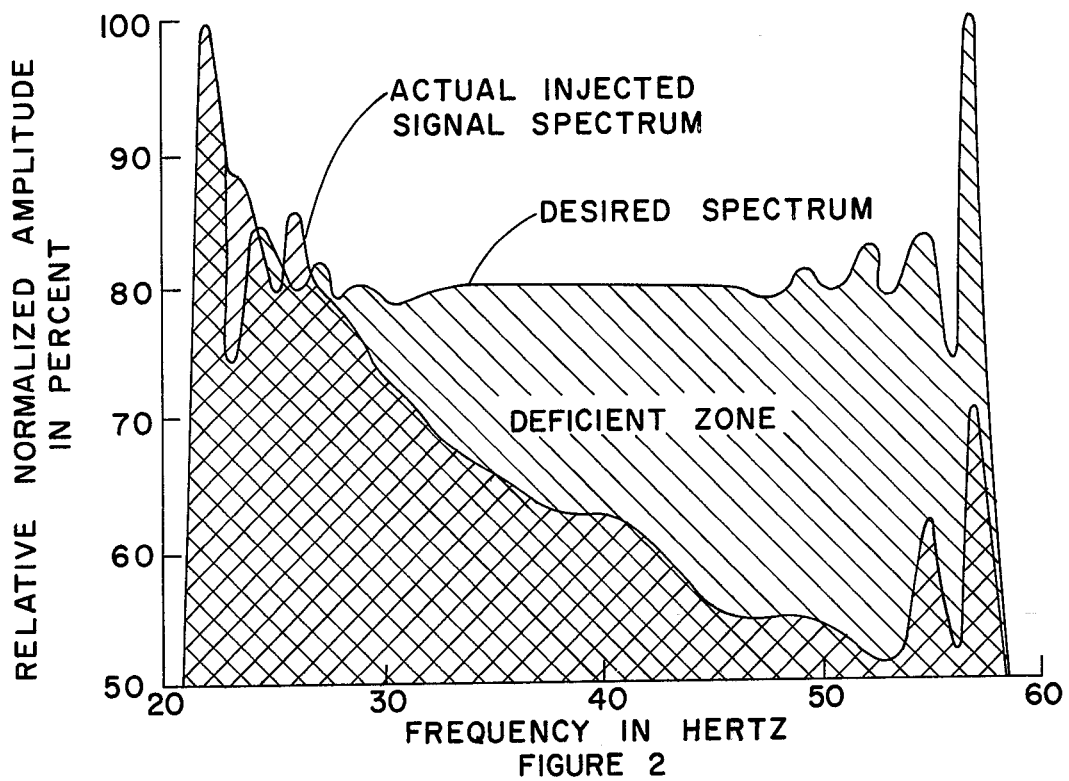
FIG. 2 graphically compares the amplitude-frequency response of a desired seismic signal to that actually obtained from a conventional vibrator operated at one position on typical soil.

FIG. 2 illustrates another amplitude-frequency response curve obtained at another field vibrator location. At this location, the high frequencies have been severely attenuated by the near-surface soil, as noted on the actual injected spectrum curve. The second curve is the desired amplitude frequency response curve for the 20 to 58 Hz pilot signal chosen to best delineate the objectives of the seismic survey. The undulations at each end of this curve are due to the Gibbs phenomenon. Although they can be eliminated by suitable tapering of the signal, this was not done at this location. The zone of deficient signal amplitude is marked on FIG. 2. My invention is designed to correct this deficiency as the signals are injected into the earth.

Figure 3:
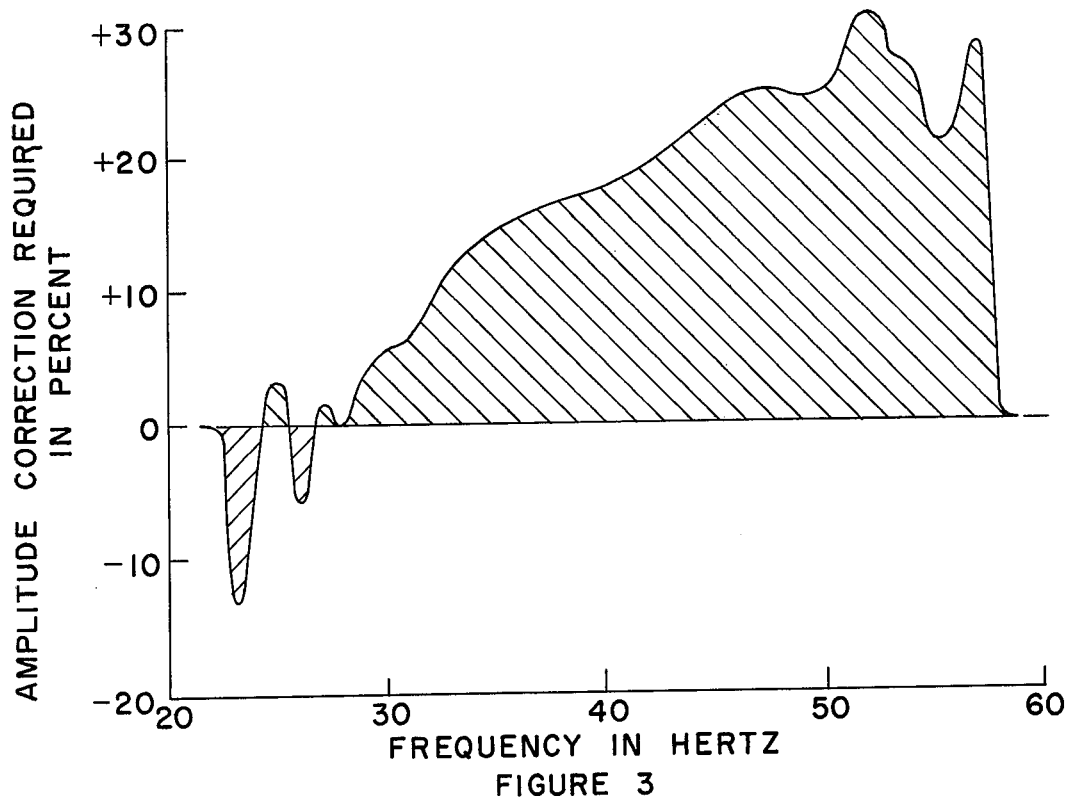
FIG. 3 shows the amplitude correction required to obtain the desired amplitude-frequency response from the actual signal injected into the earth at the vibrator position of FIG. 2.

FIG. 3 shows the amplitude correction required at the location for the data of FIG. 2 to bring each frequency of the injected signal up to the amplitude required to match the desired signal. The curve on FIG. 3 is obtained by subtracting the actual injected signal curve from the desired curve in FIG. 2. Where the amplitude of the vibrator can be increased without causing decoupling from the ground, this correction curve determines the increase or decrease in amplitude of the pilot signal needed to achieve the desired injected signal amplitude. Amplitude compensation for the near-surface filtering effects can be applied to either elongated non-repetitive type vibratory signals or to the relatively short truncated monofrequency sinusoidal signals.

In broad terms, the amplitude control concept is the equivalent of using an automatic gain control circuit, where the injected earth signal is fed back to control the amplitude of the generated signal used to operate the vibrator. However, in most commonly encountered types of surface material, the additional 30% increase in amplitude required at about 54 Hz in FIG. 3 would most likely cause the vibrator to jump off the ground. For this reason, the amplitude control method is only useful in limited geographical areas where unique surface materials will prevent decoupling. Where amplitude cannot be directly increased by the desired amount, the same result is obtained by increasing the energy of the individual components of the injected signal by modifying their frequencies and durations of those frequencies. To simplify the description of the method, truncated sinusoidal signals having numerical values of frequencies, frequency increments, and length will be discussed herein, but by way of example only. It is to be understood that signal segments having various waveforms can be used in place of simple truncated sinusoids. For example, one such signal segment might consist of the sum of several individual sinusoids. In addition, it is to be understood that elongated signals can be used in place of the truncated sinusoids. Also, it should be understood that various values of frequencies, frequency increments or signal lengths can be used in place of or in addition to those herein specifically set forth.

Figure 4:
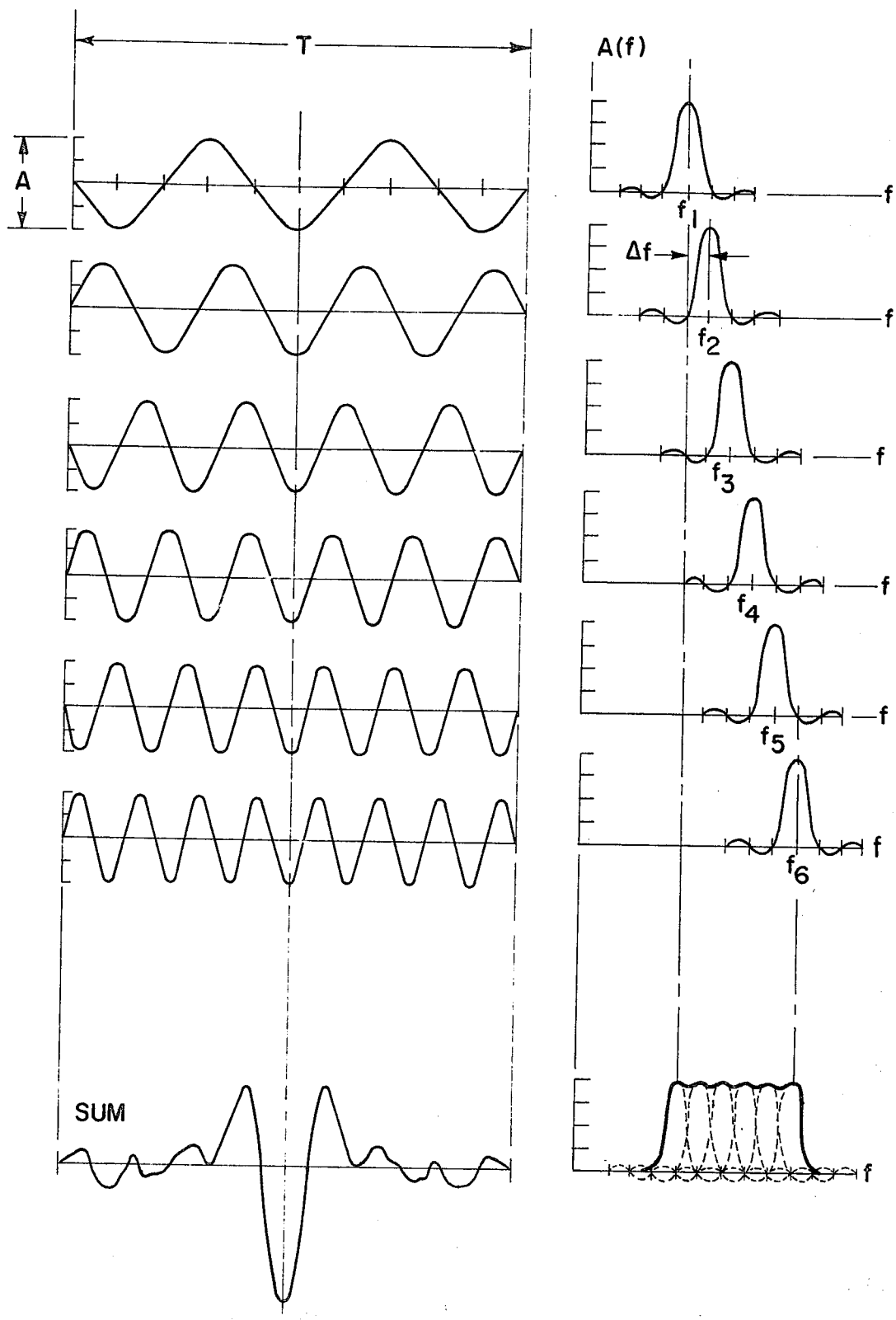
FIGS. 4–7 graphically illustrate the amplitude-frequency characteristics of injected signal waveforms useful in understanding the present invention.

The amplitude spectra of a series of truncated sinusoids are shown in FIG. 4. Since each individual amplitude spectrum is related to its corresponding sinusoidal signal by the Fourier transform, the property of Fourier transform summation may be used to derive the overall amplitude spectrum for the composite injected signal. As shown in the lower portion of FIG. 4, the composite pulse resulting from the compression of the individual monofrequency sinusoids has an amplitude spectrum which is the summation of the independently transformed spectra from the individual signals.

For a truncated sinusoid of frequency $f$, amplitude $A$, having many cycles within a duration $T$, the amplitude spectrum consists of two sinc functions centered at $\pm f$ on the frequency axis of the transform plane. Each spectrum has a peak amplitude $AT/2$ and a breadth between first zero crossings of $2/T$ as shown by R. C. Jennison in "Fourier Transforms and Convolutions for the Experimentalist," Permagon Press, New York, 1961.

When the individual sinusoidal frequencies, $f_1 f_2 f_3 f_4...$ are chosen such that the peak of the individual amplitude spectrum from each individual frequency occurs at the first zero crossings of the individual amplitude spectra of the adjacent frequency sinusoids, then the set of signals is a Fourier set. Stated another way, if the frequency increment between any two adjacent frequencies $(f_{n+1} - f_n = \Delta f)$ is equal to one-half the breadth of the amplitude spectrum curve between first zero crossings ($1/2 \cdot 2/T = 1/T$), the set of truncated sinusoids is a Fourier set. In numerical form the equation of $\Delta f = 1/T$ is called the Fourier criterion and it is the basis for the prior art techniques of seismic prospecting using monofrequency truncated sinusoids. Although the Fourier set of truncated sinusoids will produce the smoothest amplitude spectrum across a given desired band for a predetermined number of signals (i.e., the fixed $\Delta f$) or for a predetermined maximum signal length (i.e., fixed $T$), I have found it is not necessary in practice to restrict the signal frequencies or duration times to follow this criterion exactly.

Figure 5:
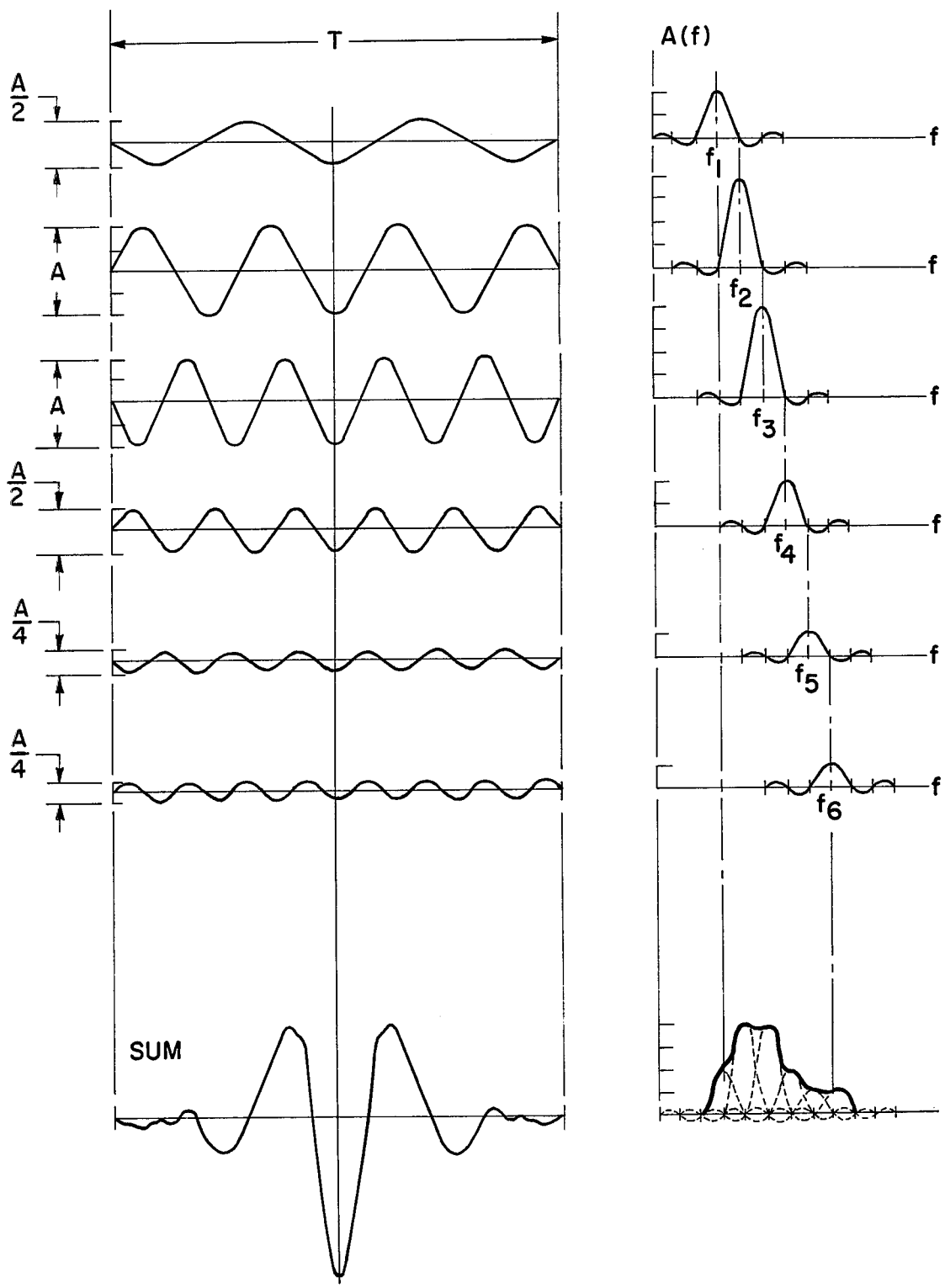

The near-surface soil materials attenuate each frequency sinusoid a different amount. FIG. 5 shows what happens if the vibrator frequency components are attenuated by various amounts. The peaks of the individual amplitude spectra curves are reduced in proportion to the attenuation each sinusoid has undergone in its passage through the near-surface material. When the individual sinusoids are compressed, the resulting pulse reflects the deficient frequencies as seen at the bottom of FIG. 5 where the pulse is lower in frequency than the equalized pulse seen in FIG. 4.

My invention modifies the spectra of the individual signals as seen in FIG. 5 to produce an optimized compressed pulse having a predetermined spectrum chosen to best delineate the subterranean geological structures which are the objective of the geophysical survey. Although the peaks of individual amplitude spectra illustrated in FIG. 5 are reduced by attenuation in the nearsurface soil, the peak position and the breadth for first zero crossing positions remain unchanged since the original signal frequencies and durations are not affected by the nearsurface material.

Increasing $A$, the amplitude of the driving signal, would increase the height of the amplitude response peak of a particular deficient signal since this height is proportional to $AT/2$. However, as pointed out above, in the majority of soils any appreciable increase in amplitude will cause the vibrator to jump off the ground. Increasing the duration $T$, of a particular deficient signal, will also increase this amplitude response peak. However, such an increase in duration will also change the shape of the individual spectrum response curve by narrowing the breadth since it is proportional to $2/T$.

Figures 6A, 6B, 6C, 6D:
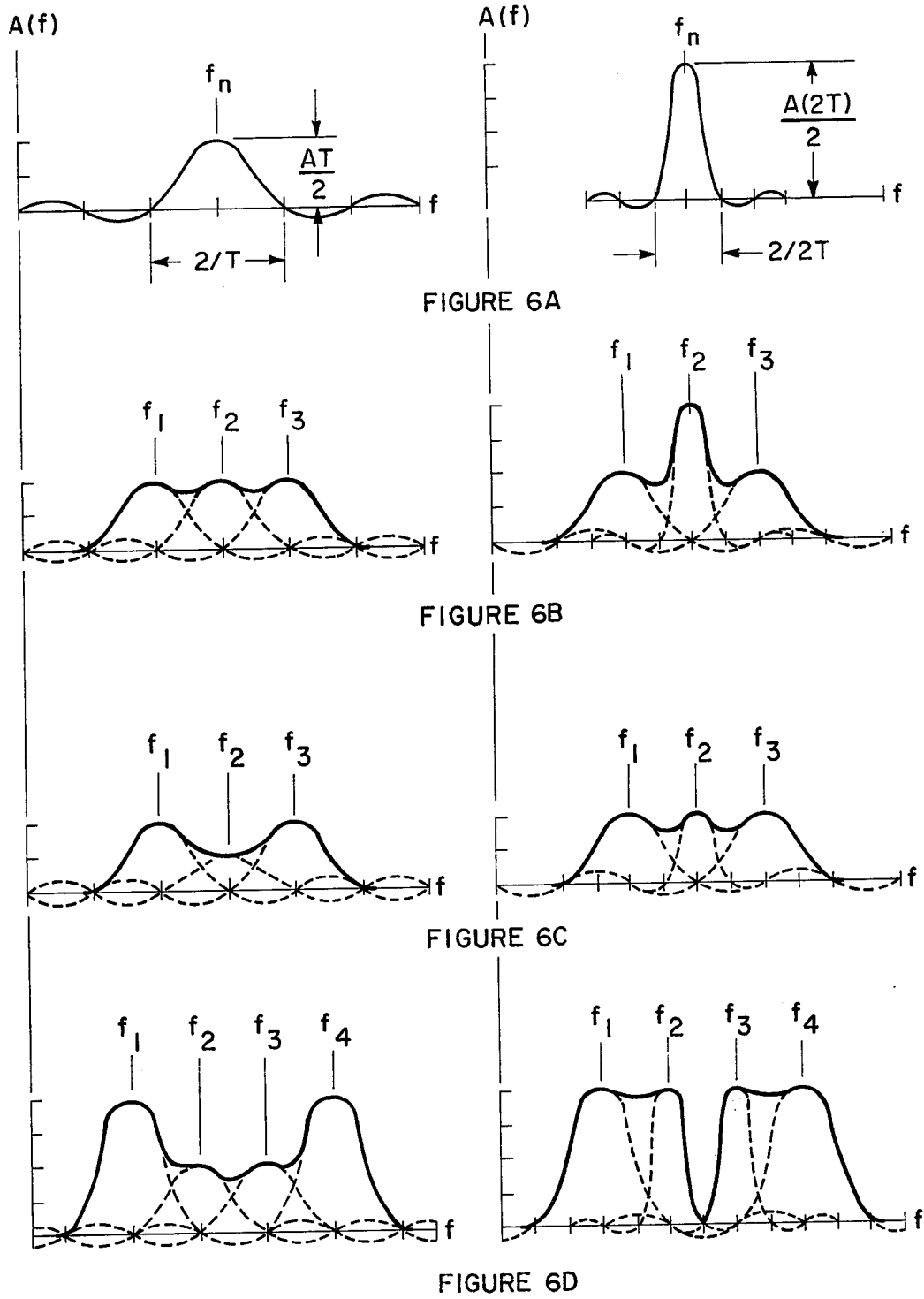

FIG. 6A illustrates the effect on the amplitude response curve of doubling the duration of a particular truncated sinsoid. The peak of the amplitude spectrum is twice as high but the breadth has been halved. This narrowing of the amplitude spectrum from a single sinusoid whose length has been increased can introduce irregularities into the composite signal spectrum when all sinusoids are compressed to a pulse. If the center frequency signal of an equal amplitude three-frequency Fourier set were doubled in length, the resulting composite spectrum would be as shown in FIG. 6B. However, if the center frequency of the original set had been 50% deficient in amplitude and this amplitude effectively increased by doubling the duration of the signal, the composite signal spectrum curves would appear as illustrated in FIG. 6C. The amplitude response curve to the right shows that after the deficient signal was increased in length, a smoother curve than the original amplitude response curve to the left was obtained. Where several adjacent frequency sinusoids are amplitude deficient and correction is obtained by increasing the respective signal lengths, a sharp notch can be created in the composite signal spectrum as shown in FIG. 6D. This undesirable notch can be filled by the addition of a new signal into the original Fourier set. This signal would have a frequency midway between $f_2$ and $f_3$ and would have a duration of the same length as signals $f_2$ and $f_3$. This additional new signal is, in effect, creating a second short Fourier set over the deficient zone. Since in the example the signal durations were doubled, the frequency increment was halved and hence the Fourier criterion maintained.

As seen in FIG. 6D, when the duration of the two signals having frequencies $f_2$ and $f_3$ was doubled, their corresponding peak spectral values were doubled while the breadth of each spectral curve was halved. The narrowing of the individual component spectral breadths creates the undesirable notch seen on the right.

If the component frequencies were changed such that $f_3$ were closer to $f_2$, the notch would be reduced. If, for example the $f_3 - f_2$ frequency increment equalled the reciprocal of the new increased signal duration $T$ of $f_2$ and $f_3$, no notch would be seen, since the Fourier criterion $\Delta f = 1/T$ would be true for these two signals.

For a group of arbitary length sinusoids, the smoothest composite spectrum will result when the frequency increment between any two adjacent frequencies approximately equals the reciprocal of their durations. It is apparent that if the two individual signal lengths are not equal, the Fourier criterion $\Delta f = 1/T$ cannot be met exactly and slight notches in the composite signal amplitude-frequency response curve will remain.

In one embodiment of the present invention the frequency increment $\Delta f$ is determined solely from the preceding signal length $T_n$ which introduces some slight irregularities in the composite spectrum curve. These irregularities are small where the near-surface attenuation is relatively a smooth function of frequency. They may be further minimized by decreasing the frequency increments $\Delta f$ or by increasing the durations $T$ of the signals in the set.

In another embodiment the frequency increment $\Delta f$ may be fixed and only the signal duration $T$ varied. Conversely, the signal duration $T$ may be predetermined and the frequency increment $\Delta f$ allowed to change. Both of these methods will introduce larger irregularities into the composite signal spectrum curve than the preferred embodiment described below. However, in many areas where the near-surface attenuation is a smooth function of frequency, the simplification in the adaptive control apparatus required to adjust $T$ or $\Delta f$ may warrant use of these alternate embodiments.

Figure 7:
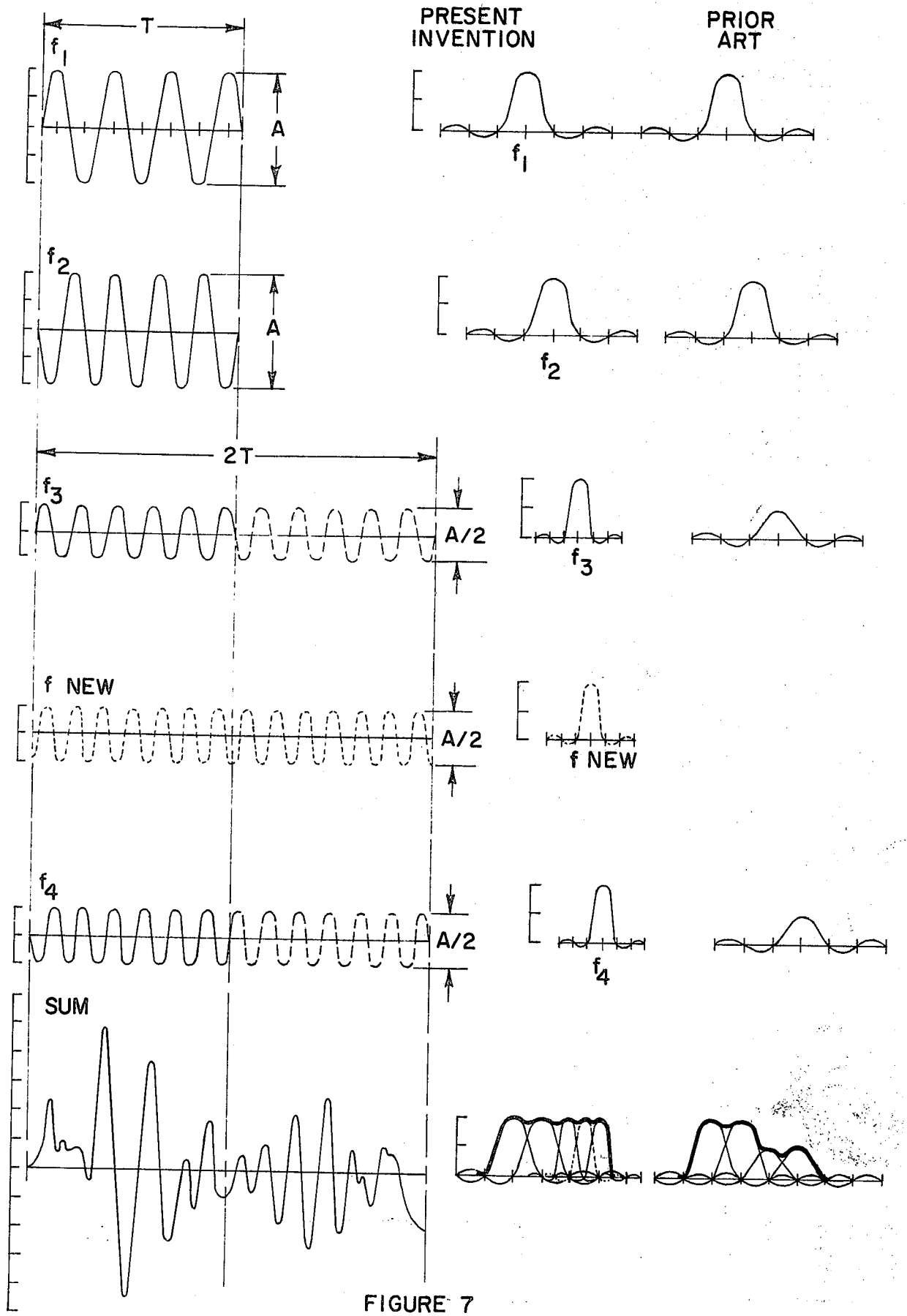

To illustrate the effect of the preferred embodiment of my invention on the composite signal amplitude spectrum, attention is directed to FIG. 7. Assume the desired composite signal spectrum is flat between frequencies $f_1$ and $f_4$. According to the prior art the radiated signal amplitudes would be considered proportional to the vibrator drive signal amplitudes and a simple equal amplitude Fourier set would be chosen to drive the vibrator. The signals of this Fourier set would then be used to acquire seismic data routinely. A signal length $T$ for all the truncated sinusoids would be chosen and then $1/T = \Delta f = f_2 - f_1 = f_3 - f_2 = f_4 - f_3$ would define the signal set such that all frequencies are related by an arithmetic series. Alternatively, some arbitrary $\Delta f$ could be chosen which would establish the signal duration $T$. For the purposes of illustration, assume at this vibrator location the near-surface material attenuates frequencies $f_3$ and $f_4$ 50 percent while passing frequencies $f_1$ and $f_2$ with no attenuation. Had the prior art Fourier set been used, the composite signal spectrum would appear as shown to the right in FIG. 7.

Using the present invention, a beginning frequency $f_1$ and an ending frequency $f_4$ are specified along with a predetermined spectral standard chosen for the area which for this comparison will be the same as the Fourier set of $f_1 f_2 f_3$ and $f_4$ discussed above. A first adaptive signal at frequency $f_1$ is started and continues to be injected into the earth until a comparator circuit establishes the energy of signal 1 is equal to the desired energy from the standard. In the example, since $f_1$ undergoes no attenuation, signal $f_1$ will continue for time $T_1 = T$ and stop. The amplitude spectrum from this adaptive signal will be identical to the corresponding Fourier signal as seen in FIG. 7.

Using the duration $T_1$ of this first signal, a control circuit takes its reciprocal to establish a $\Delta f_1$ which, when added to $f_1$, gives frequency $f_2$ for the second adaptive signal. This second signal is now injected and, like signal 1, suffers no attenuation and therefore also continues for time $T_2 = T_1 = T$. Again, this $T_2$ value is used to derive a second $\Delta f$ and thus establishes the third frequency $f_3$. Since in this example $T_1 = T_2 = T$, the $\Delta f_1 = \Delta f_2$ are those of the original Fourier set and the second signal amplitude spectrum is also identical to that shown for the original set on FIG. 7.

When the third adaptive signal at frequency $f_3$ is injected, the near-surface material attenuates the amplitude of this signal by 50 percent. As a result the comparator circuit allows this signal to continue until the energy reaches the predetermined standard. Here, since the amplitude is reduced 50 percent, the duration of the third signal will be twice that of the original Fourier signal. Since the first two signals suffered no attenuation and were equal to the Fourier signal in length, the third signal will be twice as long as the first and second signals and therefore will have an amplitude spectrum equal in peak height to the spectra of the first two signals but with only half the breadth between the zero crossing points. The modified spectrum for the length in the third signal is shown in FIG. 7 and can be compared to the individual spectrum which would be obtained using the conventional Fourier set of signals.

Since $T_3$ is twice as long as $T_2$ and new $\Delta f_3$ determined by reciprocating $T_3$ will be one-half that of the original Fourier set. Thus, a new frequency adaptive signal $f_{new}$ will be generated by my apparatus. This new frequency would not have been generated if the original Fourier set had been employed. The fourth adaptive signal at frequency $f_{new}$ will be started and will continue until its energy reaches that of the standard. In this example, since signals at frequencies $f_3$ and $f_4$ are attenuated 50 percent, a midfrequency $f_{new}$ between these two will also be assumed to be attenuated by 50 percent. Under these conditions, the fourth signal will continue for twice the duration of the original Fourier set or for the same length of time as the preceding signal.

From the duration $T_{new}$ of the new frequency signal, a fourth $\Delta f$ is derived which will establish a fifth adaptive signal frequency which, in this simple example, will be the same as $f_4$, the frequency of the fourth signal in the original Fourier set. It will suffer a 50 percent attenuation as did the preceding two signals and hence will have twice the duration of the Fourier signal. Consequently, its amplitude spectrum will be the same as the preceding two signals as seen in FIG. 7.

The composite signal spectrum of the compressed pulse, as seen at the bottom of FIG. 7, is much closer to the desired spectrum than the one obtained using the prior art Fourier set, although a slight irregularity is introduced between $f_2$ and $f_3$ on the composite spectrum curve. The first and second individual signals are part of a Fourier set between themselves and hence form a flat composite spectrum between frequencies $f_1$ and $f_2$. The third, fourth, and fifth signals are also parts of a different Fourier set and hence produce a flat spectrum between frequencies $f_3$ and $f_4$. It is between $f_2$ and $f_3$ an irregularity is produced since the durations of the signals differ by 2 to 1. In field practice where less drastic changes in signal duration are required between adjacent frequency signals to compensate for different soil attenuation, these spectrum irregularities are minimized and cause no problems.

Figure 8:
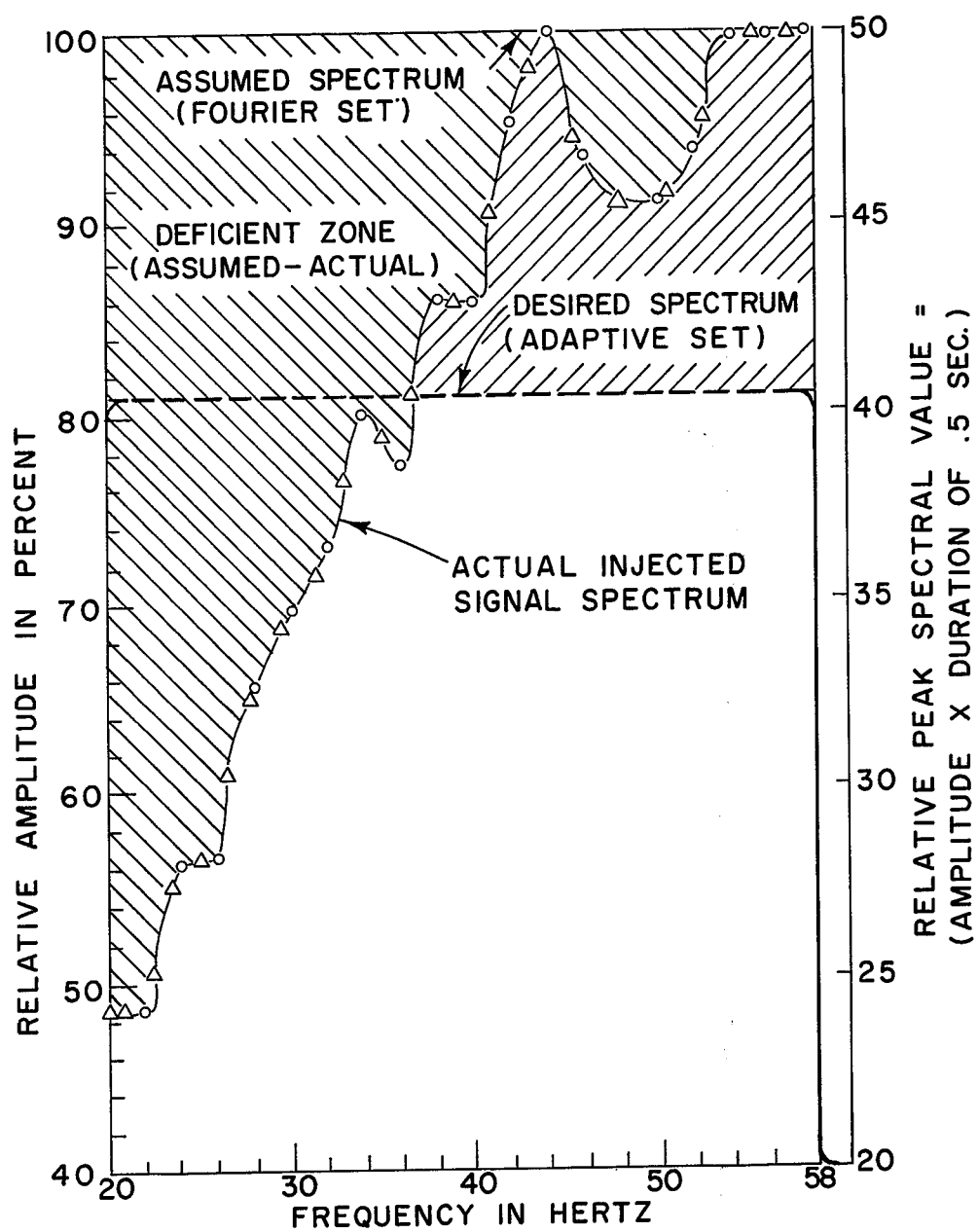
FIG. 8 shows the amplitude-frequency graph and the corresponding Fourier signals after distortion by the near-surface material.
Figure 8:
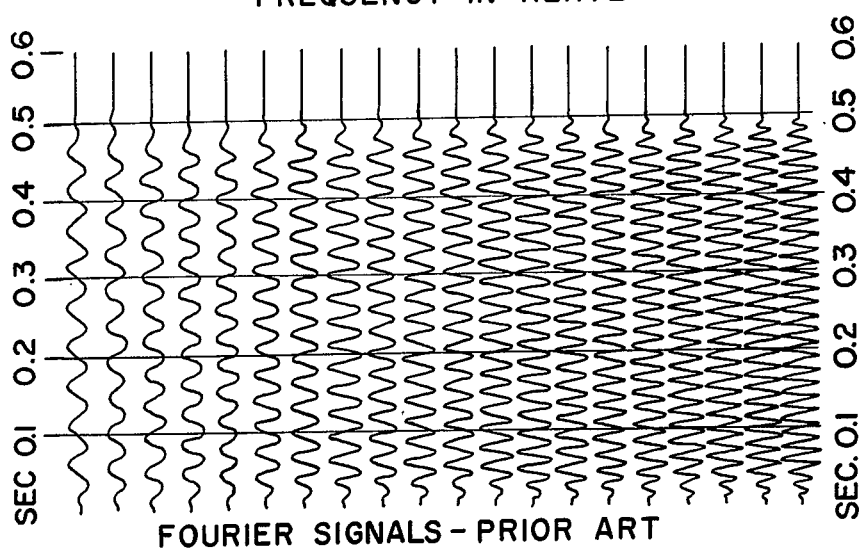

A typical amplitude spectrum obtained from field observations is shown in FIG. 8. The data from which this spectrum was derived came from a vibrator location less than 300 feet away from the vibrator location used to acquire the data shown in FIG. 2. This again illustrates the very rapid change in near-surface acoustical properties that can occur in short distances. It is of interest to note that at the FIG. 2 vibrator position an approximate 30 percent increase is required at 54 Hz, while no increase is needed at 28 Hz. At the FIG. 8 vi-

TABLE I

| PRIOR ART (FOURIER SET) | | | | | PRESENT INVENTION (ADAPTIVE SET) | | | | |
|---|---|---|---|---|---|---|---|---|---|
| Freq. (Hz) | $\Delta f$ (Hz) | Dur. (T) | Ampl. (A) | Spect. Peak Value (A·T) | Freq. (Hz) | $\Delta f$ (Hz) | Dur. (T) | Ampl. (A) | Spect. Peak Value (A·T) |
| 20.00 | 2.00 | .500 | 48.5 | 24.3 | 20.00 | 1.20 | .835 | 48.5 | 40.5 |
| 22.00 | 2.00 | .500 | 48.5 | 24.3 | 21.20 | 1.20 | .835 | 48.5 | 40.5 |
| 24.00 | 2.00 | .500 | 56.2 | 28.1 | 22.40 | 1.26 | .795 | 50.9 | 40.5 |
| 26.00 | 2.00 | .500 | 56.8 | 28.4 | 23.66 | 1.36 | .735 | 55.1 | 40.5 |
| 28.00 | 2.00 | .500 | 65.8 | 32.9 | 25.02 | 1.40 | .715 | 56.6 | 40.5 |
| 30.00 | 2.00 | .500 | 69.8 | 34.9 | 26.42 | 1.51 | .662 | 61.2 | 40.5 |
| 32.00 | 2.00 | .500 | 73.0 | 36.5 | 27.93 | 1.62 | .618 | 65.5 | 40.5 |
| 34.00 | 2.00 | .500 | 79.8 | 39.9 | 29.55 | 1.68 | .596 | 68.9 | 40.5 |
| 36.00 | 2.00 | .500 | 77.3 | 38.6 | 31.23 | 1.77 | .565 | 71.7 | 40.5 |
| 38.00 | 2.00 | .500 | 86.0 | 43.0 | 33.00 | 1.89 | .530 | 76.3 | 40.5 |
| 40.00 | 2.00 | .500 | 85.7 | 42.8 | 34.89 | 1.95 | .514 | 78.8 | 40.5 |
| 42.00 | 2.00 | .500 | 95.2 | 47.6 | 26.84 | 2.00 | .500 | 81.0 | 40.5 |
| 44.00 | 2.00 | .500 | 100.0 | 50.0 | 38.84 | 2.12 | .471 | 85.9 | 40.5 |
| 46.00 | 2.00 | .500 | 93.3 | 46.7 | 40.96 | 2.23 | .449 | 90.3 | 40.5 |
| 48.00 | 2.00 | .500 | 91.0 | 45.5 | 43.19 | 2.43 | .412 | 98.0 | 40.5 |
| 50.00 | 2.00 | .500 | 91.2 | 45.6 | 45.62 | 2.34 | .428 | 94.6 | 40.5 |
| 52.00 | 2.00 | .500 | 93.9 | 47.0 | 47.96 | 2.25 | .445 | 91.0 | 40.5 |
| 54.00 | 2.00 | .500 | 100.0 | 50.0 | 50.21 | 2.26 | .442 | 91.5 | 40.5 |
| 56.00 | 2.00 | .500 | 100.0 | 50.0 | 52.47 | 2.35 | .425 | 95.3 | 40.5 |
| 58.00 | 2.00 | .500 | 100.0 | 50.0 | 54.82 | 2.47 | .405 | 100.0 | 40.5 |
| | | | | | 57.29 | | .405 | 100.0 | 40.5 | brator position exactly the opposite corrections are required at these same frequencies.

A Fourier set of truncated sinusoids generated according to the prior art are shown in the lower portion of FIG. 8 after they have undergone distortion by transmission through the near-surface material. The Fourier set sinusoids all have durations of one-half second and hence a frequency increment of 2 Hz. The actual amplitude values of the signal after transmission through the near-surface material, as shown by the circles on the graph of FIG. 8, are tabulated in the fourth column of Table I.

The amplitude correction required to compensate for the nearsurface distortion can be obtained by direct subtraction, as was illustrated in FIG. 3.

If, for example, as shown in FIG. 8 the 34 Hz sinusoid has an 80 percent response, the 20 percent amplitude loss suffered in transmission through the near-surface material can be compensated by increasing the vibrator drive amplitude by 20 percent. However, this same deficiency can also be accomplished by increasing the duration of the 34 Hz signal.

As was shown earlier, the peak spectral value of any truncated sinusoidal component is proportional to the product of its injected amplitude and duration. Consequently, to maintain a predetermined peak spectral value, the individual signal duration must be increased when the injected signal amplitude decreases.

When the composite signal spectrum is considered as the superposition of a series of truncated sinusoid spectra, the amplitude ordinate can be replaced by the equivalent amplitude-duration product which is in turn proportional to peak spectral value of each sinusoidal component. The peak spectral value is shown to the right on FIG. 8. Since all the signals in the Fourier set used in obtaining the data shown in FIG. 8 had a uniform one-half second length, the peak spectral values are seen to be exactly half of the corresponding amplitude values. The spectral peak values for the Fourier set are shown in column 5 of Table I.

Using the prior art Fourier set, no losses would be considered in the near-surface material and each component is assumed to be injected at 100 percent of the vibrator amplitude, i.e., the signal in the ground is assumed equal to that of the vibrator.

Consequently, the assumed injected signal spectrum was flat along the 100 percent response line as shown in FIG. 8. The actual injected signal spectrum plotted on the same figure shows the fallacy of this assumption.

Adaptive signals generated according to the present invention may have any predetermined peak spectral value. For example, this value could be set at 50 for all frequencies which would correspond to the assumed 100 percent amplitude response line. The peak spectral values could vary as a function of frequency to enhance certain geological objectives of the survey. For the purpose of illustration, a constant spectral value of 40.5 was chosen and is shown as the desired spectrum line on FIG. 8. Duration T, as shown in column 8 of Table I, results from dividing the predetermined peak spectral value of 40.5 by the observed signal amplitudes which are shown as the triangles plotted on FIG. 8 and given as the values in column 9 of Table I.

Figure 9:
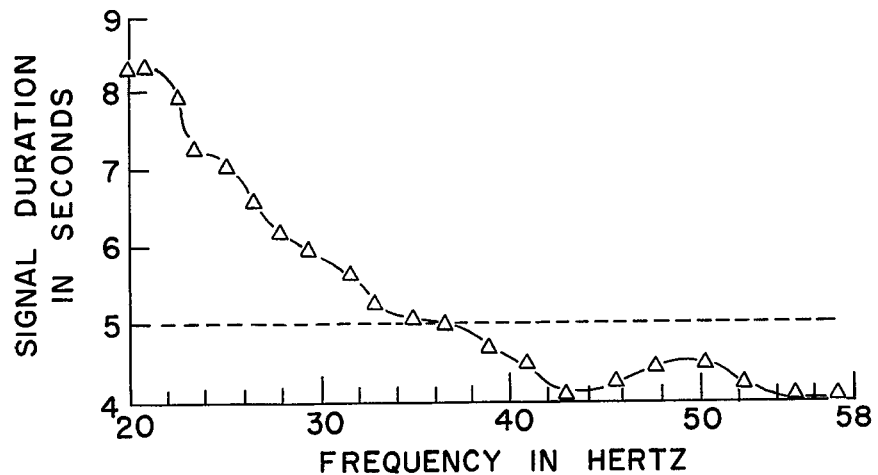
FIG. 9 shows the changes in individual signal durations required to achieve a constant peak spectral amplitude value and the resulting adaptive set signals.
Figure 9:
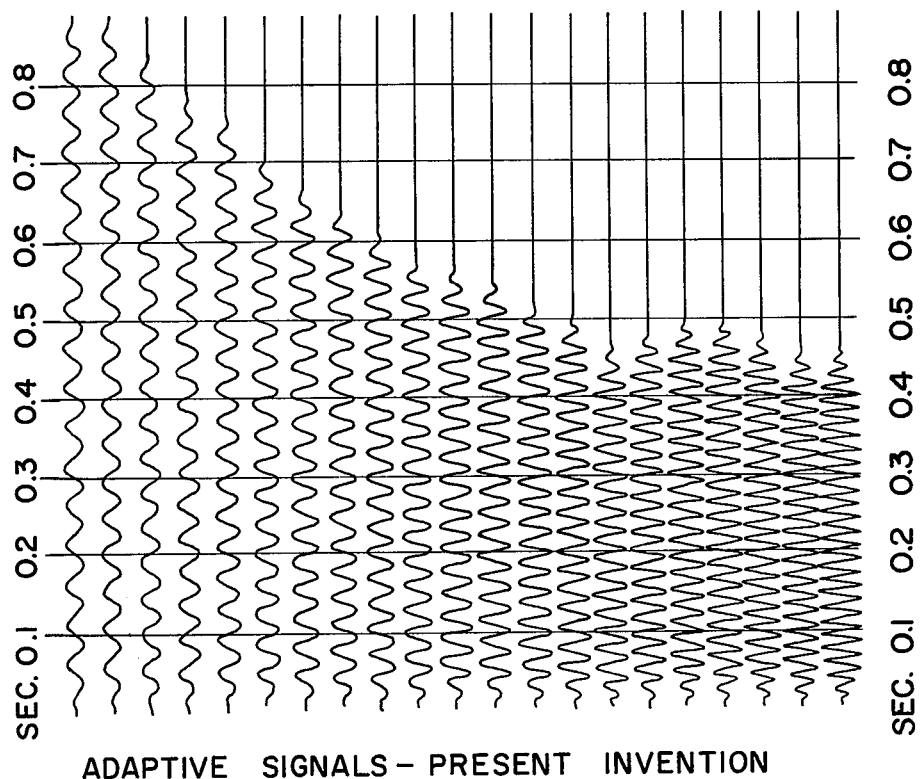

The adaptive set signal durations are plotted in FIG. 9. In addition, the signals themselves are also reproduced in this figure, as they appear after transmission through 100 feet of near-surface material. They can be directly compared with the prior art Fourier set of signals shown in FIG. 8.

Although not apparent in the reproductions, the adaptive set frequencies are different from the Fourier set frequencies. This can best be seen by comparing columns 1 and 6 of Table I. As discussed earlier, the frequencies of each signal in an adaptive set do not follow an arithmetical series but are entirely determined by the random effects of the near-surface material on the injected signal amplitude, and hence the duration of the signal required to achieve the predetermined peak spectral value.

Reciprocating the duration of the previous signal gives a new frequency increment $\Delta f$, which when added to the previous signal frequency, establishes the new operating frequency.

Multiplying column 3 by column 2 in Table I, the Fourier criterion $\Delta f \cdot T = 1$ is seen to hold for the Fourier set (as would be anticipated). However, also note that multiplying column 8 by column 9 gives the same $\Delta f \cdot T = 1$ Fourier criterion. Therefore the adaptable set signals substantially meet the Fourier criterion between any two adjacent signals, even though the individual signal lengths vary. This provision is not completely necessary, but is included to reduce the undesirable notches in the composite spectrum referred to above.

Figure 10:
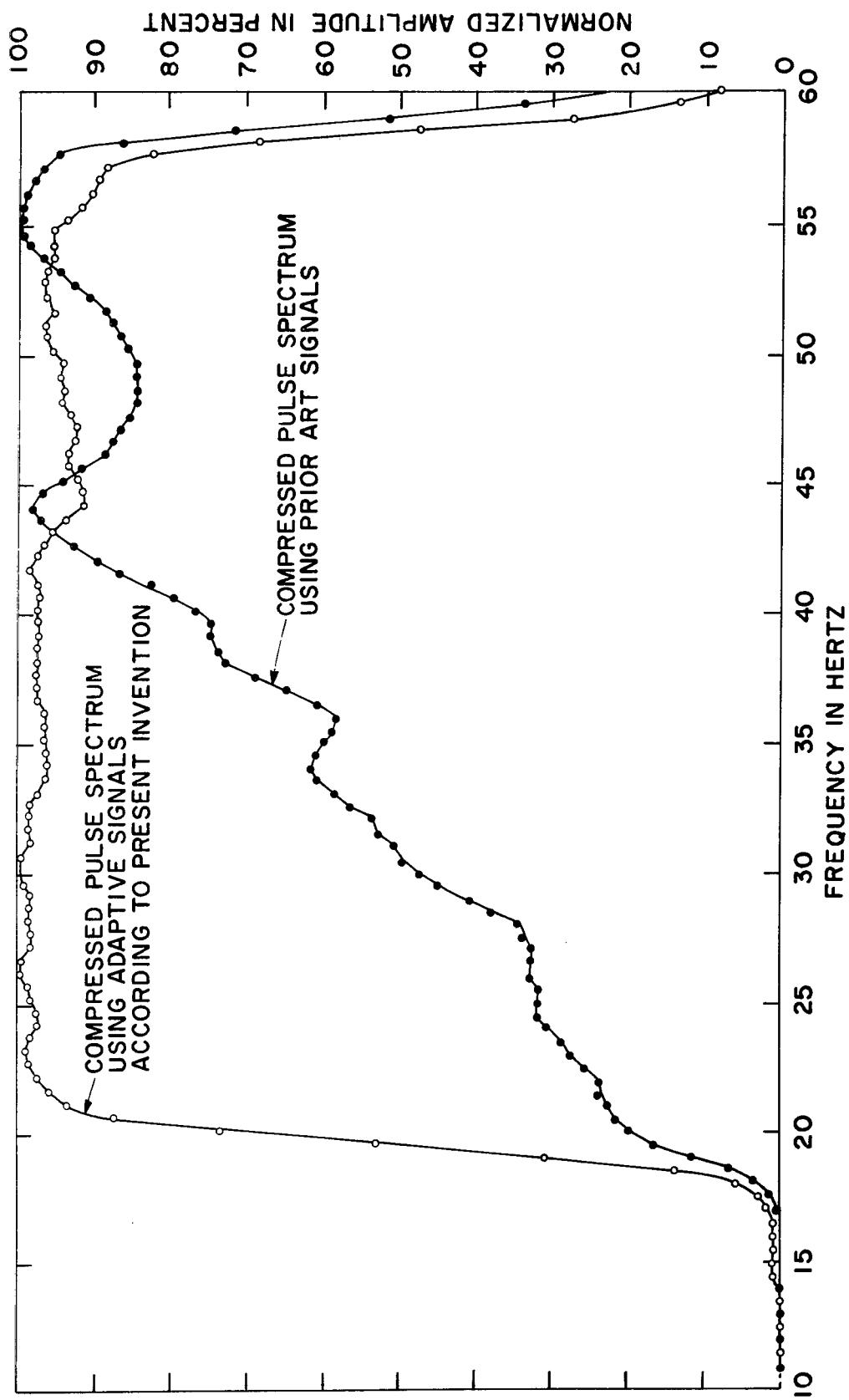
FIG. 10 graphically compares the compressed pulse spectra obtained using signals as taught in the prior art and those generated according to the present invention.

FIG. 10 shows a comparison of the spectra from the compressed pulses obtained from the Fourier set signals shown in FIG. 8, and from the adaptive set signals shown in FIG. 9. Although not perfectly flat across the 20- to 58-Hz band, the adaptive set signals produce a compressed pulse having a very much better spectrum than the one obtained using the prior art method.

Under normal field conditions the amplitude of each signal will be attenuated different amounts at different vibrator positions. Therefore, the individual injected signal lengths will vary from location to location and the derived $\Delta f$'s for each new signal will not follow an arithmetical series or any other predetermined mathematical function but rather a random sequence.

Since the signal frequencies will be related to the random variations in the near-surface attenuations, it is unlikely that the final frequency in the set determined by my invention will exactly coincide with the specified ending frequency. Consequently, when the ending frequency is surpassed, the sequence is terminated by the signal generation apparatus. The individual signal lengths being determined by the random properties of the near-surface, it is not possible to define each signal as an exact cosine wave as taught in the prior art.

Since the injected signals are not equal length cosine waves, the compressed pulse produced by direct summation is unsuitable for identification of reflections on the final display, as can be seen by comparing the pulse shape on FIGS. 7 and 4.

In the direct summation method of the signal compression, as described by McCollum in U.S. Pat. No. 3,182,743, each equal length injected signal must have a common phase alignment point which occurs at a predetermined time during the duration of the signal. Since, in the present invention, the frequency of my individual sinusoid will be dependent on the length of the preceding signal, the frequency of each sinusoid in the set will not be related by an arithmetic series. From this it can be seen that using the present invention it is not possible to obtain a set of wavelets having a predetermined phase alignment point in the middle of the wavelet, as taught in the prior art. The injected signals may be sine wavelets, cosine wavelets, or have any phase in between these extremes. Consequently, phase and amplitude of each injected signal must be considered in the compression procedure.

Mifsud, in U.S. Pat. No. 3,259,878, teaches a compression procedure for wavelets having predetermined phase and amplitude characteristics. However, since the injected signals used in the present method have what amount to random phase and amplitude values, depending on the near-surface material, a more flexible compression procedure is required.

One method, which has given good results when used with the signals derived according to my invention, is described by Laudrum in copending U.S. application Ser. No. 95,964. This method uses a cross-correlation procedure to establish a phase alignment point. This alignment point is the zero lag position of the correlation curve resulting from auto correlating each injected signal. The correlation curves from each separate sinusoid are then weighted and summed to produce the compressed pulse rather than the original signals. A Wiener filter operator is then applied to still further sharpen the pulses where required.

Since the signals which are summed in this technique have undergone a crosscorrelation process, the spectral peaks to be adjusted by my apparatus are a function of the product of signal amplitudes, or the amplitude squared. Therefore, the modification circuitry must be designed to take the amplitude squared of the injected signal rather than the amplitude when signal lengths $T$ are being determined. (This squaring circuit may be used interchangeably with the amplitude summing rectifier circuits in the apparatus described below when this particular compression technique is to be employed.)

Figure 11:
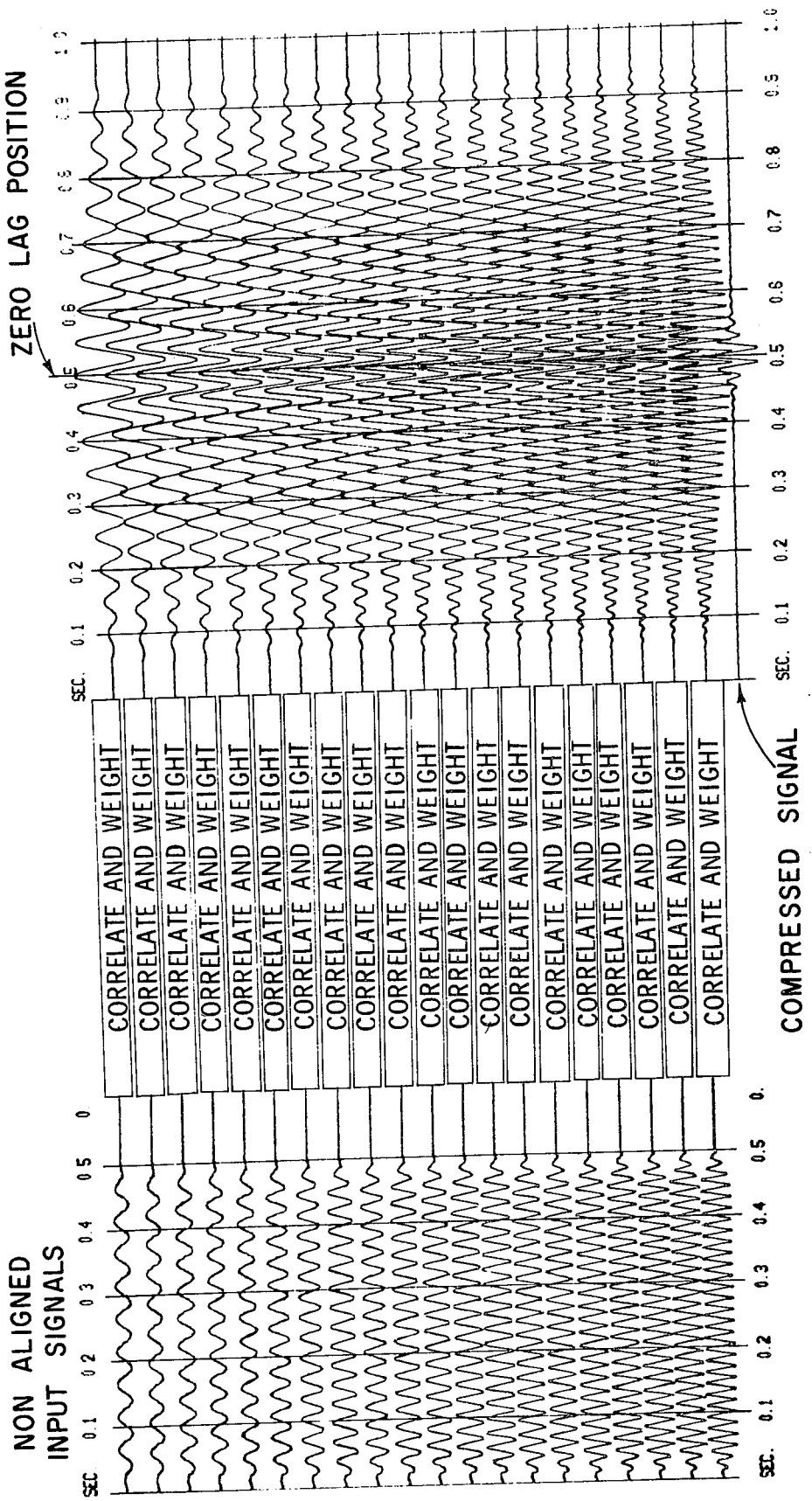
FIG. 11 is a schematic representation of one method of compressing the signals produced by use of this invention.

The Landrum compression method is shown diagrammatically in FIG. 11 with reproductions of input signals, the corresponding correlation curves obtained after the weighting step has been applied and the final compressed pulse.

Figure 12:
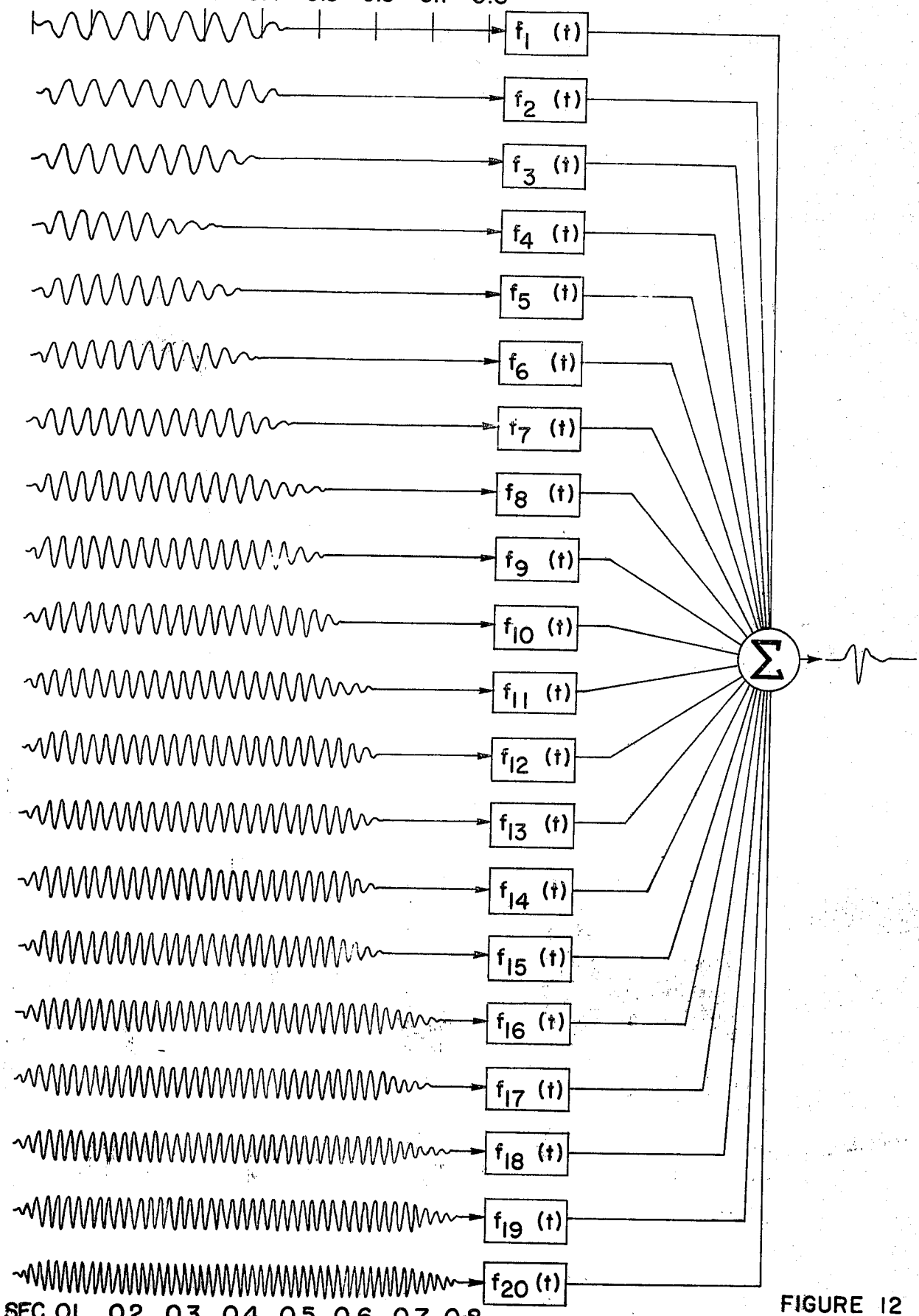
FIG. 12 shows in diagrammatic form a multichannel filtering method for compressing the signals generated by this invention.

A still more sophisticated pulse compression technique useful with the irregular frequencies and durations of the signals produced by the present invention is given by Treitel in *Geophysics*, Volume 35, 1970, page 785. This procedure, called multi-channel filtering, is ordinarily performed using a digital computer. It is diagrammatically illustrated on FIG. 12 with a set of input signals derived from a field vibrator in accordance with the principles given above. The filter operators $f_n(t)$ are complex, thereby handling both amplitude and phase variation in the input signals. The injected signals monitored on the detector used to control the comparator circuits are utilized to design the filter operators, which are then applied to the recorded signals containing the reflection events as obtained from the conventional seismometer spread.

In addition to the above two compression techniques which have been successfully employed with the self-adapted signals produced by the present invention, other methods for compressing complex sets of mono-frequency signals having varying frequencies and durations are known in the prior art.

Figure 13:
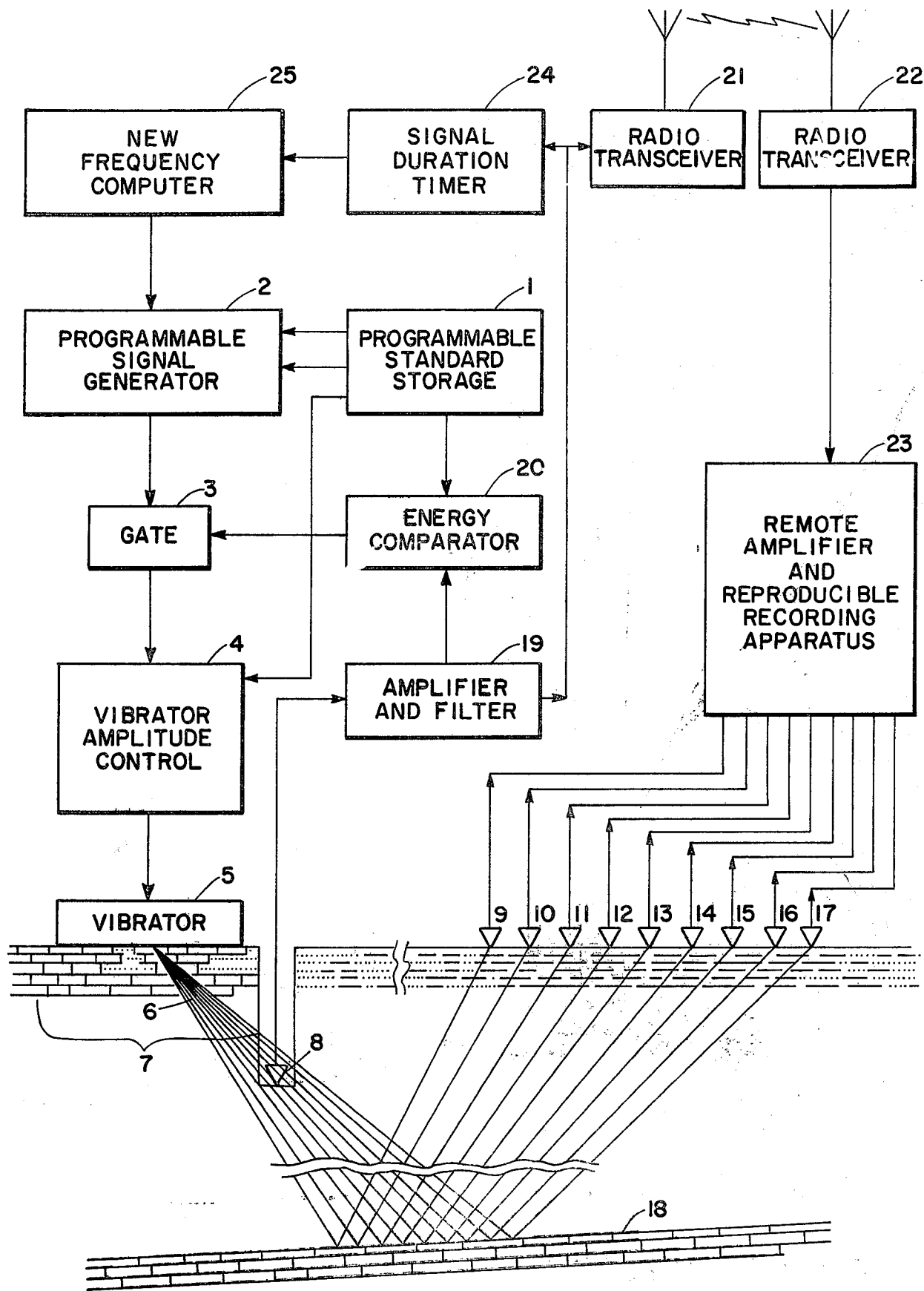
FIG. 13 illustrates in general form a vibrator control arrangement of one embodiment of this invention.

A simplified schematic diagram illustrating one embodiment of my invention is shown in FIG. 13. Predetermined information defining the desired signal to be used throughout the area under geophysical investigation is loaded into programmable standard storage 1. This information will normally consist of values proportional to desired energy response as a function of frequency, the desired delay interval between successive sinusoids and the beginning and ending frequencies, $f_i$, $f_f$ which define the composite signal bandwidth. These limiting frequencies plus the best response curve values between the limits are established from knowledge of the geological strata to be delineated by the geophysical survey and from field experimental data recorded and evaluated prior to beginning the survey. In some cases, it is desirable to achieve a flat response across the pass band, requiring storage of only a single value for all frequencies, thereby simplifying the storage apparatus.

Since the composite pulse response curve is the sum of the individual sinusoid responses, the total energy in one complete set of transmissions is established by the sum of the individual energy values entered in standard storage 1. This total required energy value is determined by field experiment and is a function of the depth to the objective reflecting interface and the signal losses due to the effects of intervening geological strata. For a very deep interface, more total energy is required than for a shallow interface. Likewise, for an objective interface below a very lossy sequency of intervening interfaces, more total energy is required than for the same objective interface beneath a uniform geological section where few intervening interfaces are present. The energy in one set of sinusoids is proportional to the combined duration of all components of the set, while the total energy at any given source point is proportional to the number of sets employed. Whether a single large set of long duration signals with small frequency increments, or a number of smaller sets of shorter duration signals with large frequency increments, best satisfy the total energy requirement must be determined from such localized field operating conditions as the ease of mobility, terrain, type of vibrator equipment, available driving horsepower, etc.

When the beginning and ending frequencies as well as the desired energy values for the frequencies in the selected band have been entered into the standard storage, the operation is ready to begin. Upon receipt of a start command, an electrical signal having the first frequency in the set (which can be either at the high or low end of the band) is initiated by the signal generator 2. Gate 3 is open passing this electrical signal to vibrator amplitude control 4. The vibrator amplitude control 4 optimizes this electrical signal to provide the maximum permissible hydraulic fluid flows and pressures causing vibrator 5 to exert the largest changing force on the surface of the earth without decoupling. Seismic waves 6 are thereby produced by vibrator 5, which after passage through distorting surface material 7 are detected by near-field seismometer 8 and by remote seismometers 9–17, which are deployed in the conventional manner for receiving reflections from subsurface interface 18.

Near-field seismometer 8 is located in a position relative to the vibrator such that the very strong outgoing signal is essentially all that is detected. This seismometer may be located in a shallow hole beneath or close to the vibrator at a depth commonly not exceeding the depth of weathering, or may be located on the surface of the earth at a distance from the vibrator normally not exceeding the depth of weathering. As mentioned earlier, I have found by experiment in many areas the nearfield seismometer 8 may be located on the baseplate of the vibrator itself and still provide an excellent replica of the outgoing signal.

The electrical signal produced by near-field seismometer 8 is then amplified and filtered by fixed gain amplifier and tracking filter 19, to a level suitable for comparison in energy comparator 20 with the desired reference previously stored in standard storage 1. At the same time the signal is being compared, it is being transmitted by radio transceiver 21 to radio transceiver 22 at the remote amplifying and recording apparatus 23 where it is reproducibly recorded along with the conventional electrical signals from seismometers 9–17 for use in the subsequent pulse compression procedure.

Signal generator 2 continues to generate this first signal until energy comparator 20 determines the summed amplitude or the summed amplitude squared of the signal received from near-field detector 8 equals the predetermined value stored in standard storage 1 at which time gate 3 closes, cutting off the signal from generator 2. The duration of this first signal $T_1$ is measured by signal duration timer 24 and then reciprocated in new frequency computer 25 to obtain frequency increment $\Delta f_1$. This frequency increment $\Delta f_1$ is then added to the first frequency $f_1$ to determine the new frequency $f_2$. The second signal $f_2$ then begins and continues until duration $T_2$ of the second signals integrated amplitude equals the value stored in the standard. This cycle is repeated for frequencies $f_3, f_4, ...f_n$. When the frequency of the signal to be generated exceeds the predetermined ending frequency $f_f$ the operation is terminated and the apparatus is reset to $f_1$ ready to repeat the entire sequence at a different vibrator position.

Note that the signals may be injected sequentially with a very short delay between sinusoids, thereby producing an elongated signal consisting of many juxtaposed repetitive segments. On the other hand, the signal may be sequentially injected with a delay between individual sinusoids which is at least as long as the traveltime of the seismic waves to and from the deepest reflecting interface of interest, which produces a series of monofrequency recordings whose frequencies are not related to an arithmetic series, as taught in the prior art. The choice of which method is most advantageous must be based on relative cost comparisons of field time required to acquire the data against the computer time required to compress the received signals to the sharp pulse required for reflection identification.

Where necessary, a number of synchronized vibrators may be used simultaneously to increase the total energy injected into the ground per unit time. Because these vibrators would be operating on different soils, an apparatus attached to each vibrator would produce different length signals and consequently different frequency increments which would quickly destroy the required synchronization. Multiple vibrators produce an average injected signal into the earth, consequently the near-surface effects associated with each vibrator may be averaged to produce a common set of driving signals. This is accomplished by combining the outputs of nearfield seismometers associated with each vibrator and producing a common comparison signal from which a single signal generator produces the pilot signal used to drive all vibrators in synchronization. (As an alternate, one near-field seismometer may be used for all vibrator units, but this is not preferable.) Where the field mobility is paramount, this would involve radio links between the slave vibrators and a master vibrator containing the comparator and signal generator. These radio links would transmit the near-field signals produced by the near-field detector 8 on each slave vibrator to the master, where they would be combined to control the common driving signal. The slave vibrators would also receive by radio the common drive signal from the variable signal generator 2 in the master vibrator to operate the vibrator drive controls 4 located in each vibrator.

A more detailed schematic diagram of the preferred embodiment of the present invention is shown in FIG.

14. Although analog circuits could be employed throughout, this embodiment utilizes digital logic circuits to perform the comparison and control function and a digitally controlled analog signal generator and attenuator to modify the analog vibrator driving signals. The digital logic units shown are commercially available items or can be easily assembled from commercial units by one skilled in the art of digital circuit design. Such common digital logic units such as Latches, AND gates, OR gates, pulse counters, inverters, etc. can be found in the digital equipment catalogs of a large number of manufacturers. For example, the Latches described in this invention are available from Texas Instruments, Incorporated, Dallas, Texas, as Model No. SN7475; AND gates, as Model No. SN7408; OR gates, as Model No. SN7432, inverters as Model SN7406, and pulse counters as Model SN7493.

Figure 14:
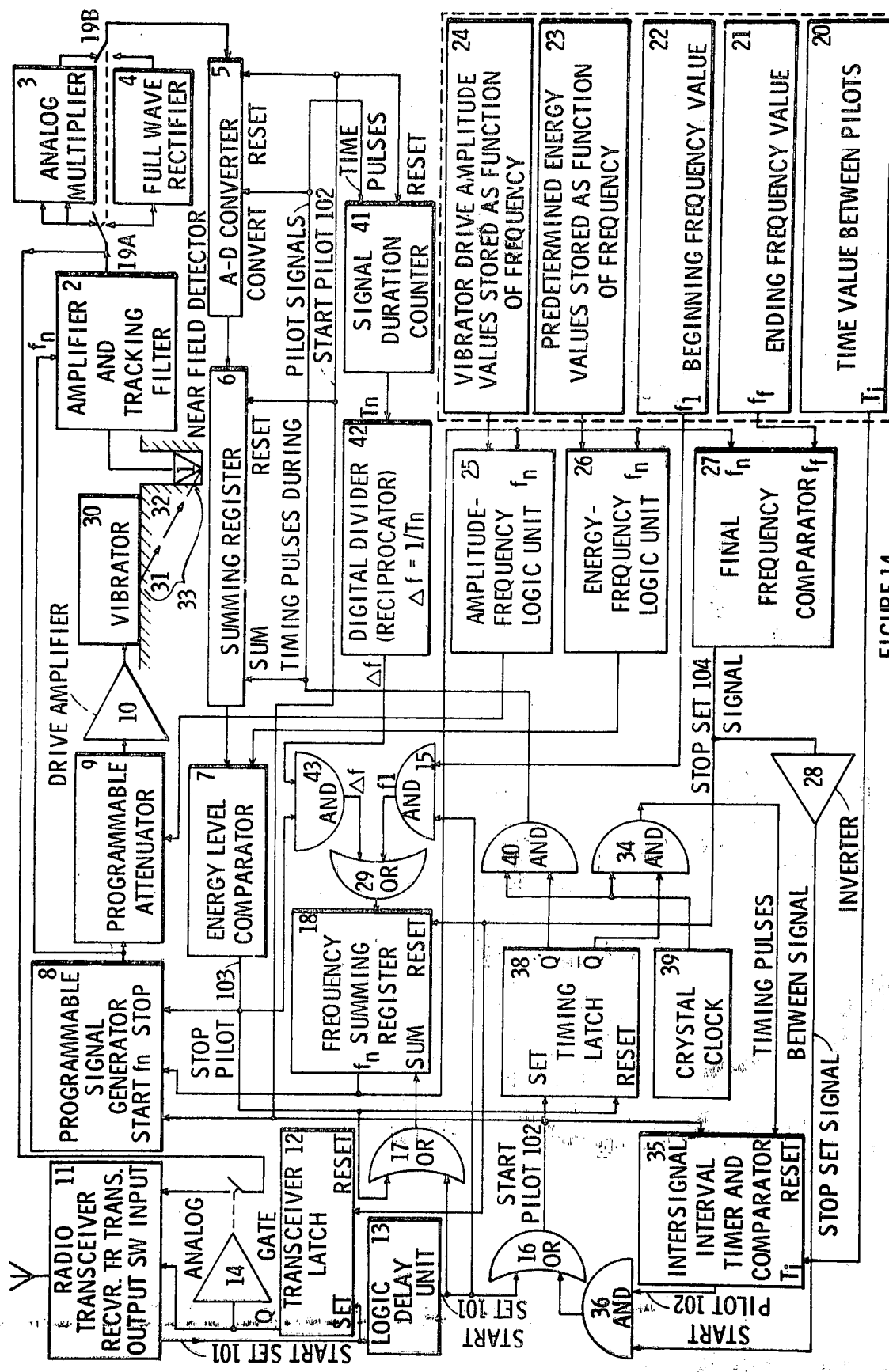
FIG. 14 schematically illustrates in more detail the vibrator control arrangement shown in FIG. 10.

The apparatus shown in FIG. 14 automatically determines the two basic variables duration $T_n$ and frequency $f_n$ of each individual sinusoid in a given set. Certain additional parameters are required to permit fully automatic operation. These additional parameters are chosen once for a given prospect area and entered into a programmable storage unit for use during routine operations. The apparatus shown in FIG. 11 is designed for automatic operation throughout an entire area with no intervention required on the part of each vibrator operator, other than to move the vibrator from position to position.

Since the length of each individual signal is determined by comparing the near-field injected signal as detected on seismic transducer 1 with a predetermined energy standard, this standard must be loaded into programmable storage 23 before operation can begin. The energy standard may be entered in one of two ways. First, a series of desired energy values, one for each of a series of discrete frequencies across the seismic band of interest may be entered. A logic unit 26 is required to access the energy value in storage unit 23 which most closely corresponds to the operating frequency $f_n$ at that particular time in the operating cycle. Alternatively, the standard can be entered as coefficients of a polynomial expressing the desired energy as a smooth function of frequency. In this configuration another type of logic unit 26 is required to evaluate the polynominal and hence produce the standard value for the particular operating frequency. Where simple first or second-order polynomials will approximate the desired response, the second method is to be preferred. However, where the geological objective dictates the use of more complicated energy distributions, the first method is recommended. Whichever method is employed, a predetermined energy value is required for each operating frequency.

A second parameter, the amplitude of the electrical signals used to drive the vibrator, is also entered into a second programmable storage unit 24, as either discrete values for given frequencies or as coefficients of a polynomial expressing the desired amplitude as a function of frequency. Different types of soil will permit different maximum drive signal amplitudes before a field vibrator will jump off the ground. This maximum permissible drive amplitude is a function of the signal frequency. In vibrator operation as presently practiced, a single drive level amplitude is chosen for all frequencies based on whatever frequency signal first causes decoupling from the ground. By use of the digitally programmed attenuator 9, the output of signal generator 8 can be adjusted frequency by frequency to optimize the energy transferred to the ground. Most commercial vibrators first become decoupled at the lower seismic frequencies permitting much higher drive levels above 20 to 30 Hz.

While the attenuation values could be determined by an energy comparator circuit, as described above, it has been found more convenient to enter them as fixed parameters for use over a given exploratory area. These attenuation values are experimentally determined by a simple field test where for a series of monofrequency drive signals the amplitude is manually increased for each frequency across the band of interest until decoupling is observed. After adding a safety margin, these values are entered into programmable storage 24 and accessed as required by the attenuation control logic unit 25 to optimize the amplitude of the vibrator drive signals for each frequency in a given set.

Three additional parameters are required to operate the system shown in FIG. 11. The first two of these, the beginning frequency $f_1$ and the ending frequency $f_f$, are respectively entered into programmable storage units 22 and 21. These values determine the bandwidth of the set and are specified as a result of the tests outlined earlier.

The final parameter required is the inter-signal time $T_i$ which must elapse between the individual sinusoids. It is entered into programmable storage unit 20. This value may vary from zero to a period of time exceeding the traveltime of the seismic waves from the vibrator to the deepest reflecting interface of interest and back to the seismic detector farthest removed from the vibrator. Choice of this value depends on the method of pulse compression employed. If the entire set is to be processed such that an elongated signal is compressed to a pulse by crosscorrelation or Wiener filtering, then zero or very small time increments should elapse between the successive sinusoids. On the other hand, if each frequency is to be separately processed, as in the two methods described above, the best signal-to-noise ratio can be achieved by using relatively long periods of time between the successive sinusoids. Other parameters, such as the longest available recording time on the field recording apparatus, and the maximum record length which can be processed in a computer center, will also affect the choice of this value. It should be understood that either of the frequency varying parameters could be entered as constant values, thereby simplifying the apparatus but restricting its flexibility.

After the required parameters have been loaded in the programmable storage, 20, 21, 22, 23, 24, the apparatus is ready to operate upon receipt of a start-set command from the remote amplifying and recording apparatus. This start-set command would normally be received on radio transceiver 11 from a similar unit located in the remote recording truck. A wire line could be substituted for the radio link where field operating conditions permit.

The start-set command 101 is directed from radio transceiver 11 to the set input of tranceiver Latch 12 and Logic Delay Unit 13. The output of Latch 12 switches the radio transceiver from the receive to transmit mode and simultaneously activates analog gate 14 such that the injected signal output from seismic transducer 1 through amplifier and tracking filter 2 is directed to the transmitter input of radio 11 for transmission back to the remote amplifying and recording apparatus. A typical analog gate is Model DG 184, built by Siliconix Incorporated, 2201 Laurelwood Road, Santa Clara, California. This injected seismic signal is reproducibly recorded at the remote recording location along with the reflection signals from the conventional spread of seismometers. It is required for the later processing needed to compress the set of sinusoidal signals to a sharp pulse.

Start-set command 101 is delayed in delay unit 13 for sufficient time to allow radio transceiver 11 to settle into the transmit mode, whereupon this command is directed to AND gate 15 and the inputs of OR gates 16 and 17. At AND gate 15 the start-set command permits the starting frequency value $f_1$ to be transferred from programmable storage unit 22 through OR gate 29 into frequency summing register 18. Only a single AND gate 15 is shown to simplify the schematic diagram; however, it is to be understood that one such AND gate is required for each binary digit describing the starting frequency. The start-set command also passes through OR gate 17 where it becomes the first summing command for frequency summing register 18. The output of frequency summing register 18 which now contains only $f_1$ is directed to programmable signal generator 8 where it establishes the first operating frequency $f_1$ in the set. Programmable signal generator 8 is a commercial digitally controlled analog signal generator, Model SHV-210, built by Electro-Technical Laboratories, Incorporated, Houston, Texas. The principles of this operation are taught by Bobbit in U.S. Pat. No. 3,626,267.

The start-set command 101 from Logic Delay Unit 13 also passes through OR gate 16 whereupon it becomes the first start pilot command 102, which starts programmable signal generator 8 into operation. The analog monofrequency signal output from digitally programmable signal generator 8 goes to analog amplifier and tracking filter 2 where it controls the frequency of the tracking filter so as to attenuate all frequencies other than the particular frequency currently being injected into the ground. The analog signal from signal generator 8 also passes through digitally programmable attenuator 9 where its amplitude is adjusted according to the predetermined value for the $f_1$ operating frequency as stored in vibrator drive amplitude storage 24 and accessed by amplitude frequency control logic 25. This attenuated analog signal is then directed to the vibrator drive amplifier 10 where it controls the mechanical action of vibrator 30 in the same manner as taught in the prior art.

In response to the analog drive signal, vibrator 30 applies a changing force to the surface of the earth 31, which generates seismic waves 32. These seismic waves at frequency $f_1$ are attenuated by the near-surface soil zone 33 before reaching near-field seismic detector 1. Near-field seismic detector 1 is so located as to detect the injected seismic wave after the near-surface attenuation has occurred. As shown diagrammatically in FIG. 11, this is at the bottom of a shallow hole near the vibrator. As discussed above, this detector may ordinarily be positioned on the vibrator baseplate without adversely affecting the operation of the system.

The electrical signal from near-field seismic detector 1 is amplified and filtered by amplifier and tracking filter 2. Such a unit is manufactured by Spectral Dynamics Corporation of San Diego, California, as Model SD131. Here it is to be understood that a switchable bank of narrow pass-band filters could be substituted for the tracking filter with a slight increase in complexity. Filtering is required to eliminate the strong harmonics and extraneous noises produced by the nonlinear near surface region 33 immediately below the vibrator.

The analog signal output from amplifier and tracking filter 2 consists essentially of the fundamental component of the injected signal which is fed through analog gate 14 to radio transceiver 11 for transmission back to the remote amplifying and recording apparatus as described above. This same filtered analog signal is directed by switch 19-A to either analog multiplier 3 or full wave rectifier network 4, depending on the criterion established by the subsequent compression procedure, as discussed earlier. The two multiplier inputs both receive the analog signal from amplifier and tracking filter 2 and the output signal is proportional to the square of the input signal such that all signal values are positive.

It switch 19-A is connected in the other position, full wave rectifier 4 is connected to amplifier and tracking filter 2. This rectifier puts out a unipolar electrical signal proportional to the absolute value of the input signal. Depending on the position of switch 19-B, the signal from analog multiplier 3 or full wave rectifier 4 is directed to analog/digital (A/D) converter 5. This converter is a commercially available unit such as Model No. AD 530, manufactured by Analog Devices Corporation of Norwood, Massachusetts. A/D converter 5 changes the positive valued analog signal from analog multiplier 3 or full wave rectifier 4 into a series of digital numbers at a rate determined by crystal clock 39 through AND gate 40. A typical crystal clock is the Model SOXO-1, manufactured by STATEK Corporation, 1200 Alvarez Avenue, Orange, California. AND gate 40 only outputs clock pulses when enabled by timing latch 38, which is set by the same start pilot command 102 from OR gate 16, which was used to initiate the generation of analog signals in the programmable signal generator 8. From AND gate 40 these clock pulses from crystal clock 39 are directed to A/D converter 5, summing register 6, and signal duration interval counter 41.

In analog digital converter 5 the clock pulses initate each analog-to-digital conversion and the transfer of this converted digital value to summing register 6. In summing register 6 the clock pulses control the addition of the most recently received digital number from A/D converter 5 to the previously accumulated total.

The clock pulses are totalized in signal duration counter 41 to provide an output representing the cumulative duration of the individual pilot signal $T_n$ which is then directed to the divisor input of digital divider 42. The dividend input of digital divider 42 is permanently set to unity such that it acts as a reciprocator putting out values equal to $1/T_n$. By reciprocating the signal duration, the output signal becomes the incremental frequency $\Delta f$ needed to determine the next operating frequency in the set.

The output of digital divider 42 is directed to one input of AND gate 43 which is opened by the stop pilot command at the end of the current injected signal. Here, as with AND gate 15, only a single gate is shown for clarity, although it is understood that separate gates are required for every binary digit describing the frequency increment. At the end of the currently generated signal when it can pass through AND gate 43 and the OR gate 29 the signal representing $\Delta f$ from digital divider 42 is input to frequency summing register 18 where it is added to the previously accumulated value representing the current operating frequency. Only one OR gate 29 is shown for clarity, but as with AND gates 15 and 43 there must be as many OR gates as there are digits describing $f_1$ and $\Delta f$. Since only $f_1$ has previously been entered into frequency summing register 18, the second operating frequency $(f_2 = f_1 + \Delta f_1)$ is determined and directed to programmable signal generator 8, as described earlier. Thus, it can be seen that for any frequency driving signal whose duration is controlled by timing Latch 38, the next operating frequency in the set is determined according to the $F_{n+1} = F_n + 1/T_n$ criteria, by signal duration counter 41, digital divider 42, AND gate 43, OR gate 29, and frequency summing register 18.

The operation of timing Latch 38 is initiated by the start pilot command 102 and the current operating frequency will continue until programmable signal generator 8 is turned off and timing latch 38 is switched by receipt of a stop pilot command 103. The stop pilot command 103 is generated by digital energy comparator 7 when the accumulated energy values from the energy summing register 6 equals the value for the particular operating frequency is determined by the energy value selection logic 26 from programmable energy value storage 23.

Energy value storage 23, like drive amplitude storage 24, may consist of a programmable read-only memory, a replaceable fixed read-only memory, a card input reader, a tape reader, or even a series of multiposition electrical switches. The logic units 25 and 26 will vary, depending on what type of storage is employed. These logic units require the current operating frequency $f_n$ from the frequency summing register 18 to establish the required drive amplitude value for use in programmable attenuator 9 and the predetermined energy level for use in energy level comparator 7. In some instances, these logic units will be integral with the storage unit; in others separate external logic units will be required to access the proper values of drive amplitude and signal energy for the particular operating frequency.

Digital energy level comparator 7 receives the predetermined standard energy value from storage 23 through logic unit 26 at one input and the continuously updated cumulative total from energy summing register 6 at the other terminal. When the accumulated energy values corresponding to the injected seismic signal equals that from the energy value storage, digital energy comparator 7 outputs a stop pilot command 103 which stops programmable signal generator 8, thereby stopping the generation of the analog drive signal, and opening AND gate 43 permitting the final value of $\Delta f$ to be transferred to the frequency summing register 18 to establish the next operating frequency in the set, as described above. The stop pilot signal also passes through OR gate 17 where it commands frequency summing register 18 to execute the sum of the $\Delta f$ from AND gate 43 and the existing operating frequency value retained in this register.

This same stop pilot command from energy comparator 7 resets timing latch 38, thereby closing AND gate 40 and opening AND gate 34. Closing AND gate 40 stops any further transmission of time pulses from crystal clock 39 to analog-to-digital converter 5, energy summing register 6, and signal duration counter 41, thereby stopping further energy comparison and new frequency computations.

When AND gate 34 is opened by the action of timing Latch 38, the free running crystal clock 39 pulses are directed to programmable intersignal time interval counter and comparator 35 where they are compared with a predetermined inter-signal duration $T_i$ previously loaded into programmable storage unit 20. When the desired inter-signal time interval $T_i$ has passed, an output pulse is generated by the inter-signal counter and comparator, which passes through AND gate 36 and then through OR gate 16 to become the new start pilot signal 102. This new start pilot signal initiates the entire operation again for the new frequency $f_2$ in the set in the same manner as the initial start-set command 101 signal did on the first frequency in the set. The start pilot command 102 is used to reset analog-digital converter 5, summing register 6, signal duration counter 41, and programmable inter-signal time interval counter 35 so that they can begin the operating cycle again.

The second frequency will continue until its energy level reaches the desired level for that frequency, then a new frequency increment will be computed and added to the operating frequency to determine the third frequency in the set.

This cycle will then continue automatically, frequency by frequency, until the operating frequency $f_n$ exceeds the predetermined ending frequency value stored in programmable final frequency storage 21. Final frequency comparator 27 outputs a stop-set command 104 when the frequency $f_n$ from the frequency summing register 18 equals or exceeds the previously stored final frequency $f_f$. This stop-set command from the output of final frequency comparator 27 is directed through inverter 28, whereupon it closes AND gate 36, preventing any further start pilot commands from the programmable inter-signal time interval counter and comparator 35. The end of set command 104 from final frequency comparator 27 is also used to reset transceiver Latch 12, switching radio transceiver 11 back from the transmit mode to the receive mode preparatory to receiving the next start of set command from the remote amplifying and recording apparatus. This same end of set command 104 used to reset frequency summing register 18 to zero prior to beginning the entire cycle again.

While the invention has been described in some detail in connection with the preferred embodiment shown above, numerous modifications will be readily apparent to those skilled in the art of analog-digital circuit design.

I claim:

1. In a seismic prospecting apparatus of the type having a controllable source which radiates a seismic signal into the earth in accordance with an electrical drive signal, a plurality of seismometers spaced along the surface of the earth at a distance from said source for the purpose of generating electrical signals corresponding to the seismic waves impinging on the surface from subterranean reflecting interfaces, and an apparatus for amplifying and reproducibly recording said electrical seismometer signals, the improvement which comprises:

a. an adjustable signal generation means connected to said controllable source for producing said electrical drive signal whose characteristics may be changed in response to an external electrical control signal;

b. a detecting means located near said source for producing a near-field electrical signal corresponding to said radiated seismic signal after it has been distorted by the earth material adjacent to said source;

c. means for producing a first value proportional to the energy of said near-field electrical signal which is electrically connected to said detecting means;

d. means for storing a predetermined second value proportional to the energy desired in said radiated seismic signal;

e. means electrically connected to said first energy value producing means and said second value storage means for the purpose of producing a comparison signal; and f. means in circuit relationship with said comparison means and said adjustable signal generator means for producing said external electrical control signal for the purpose of modifying a characteristic of said electrical drive signal in accordance with said comparison signal.

2. A seismic prospecting apparatus as recited in claim 1 further comprising:

a. a filtering means electrically connected between said detecting means and said first energy value producing means for the purpose of attenuating harmonics and other extraneous noises produced by said source; and b. means electrically connected to said filtering means for reproducibly recording said filtered near-field electrical signal.

3. A seismic prospecting apparatus as recited in claim 1 in which said detecting means comprises a transducer mounted on said source, said transducer being responsive to the motion of that portion of said source in direct contact with the earth.

4. A seismic prospecting apparatus as recited in claim 1 in which said detecting means comprises one of said plurality of seismometers spaced along the surface of the earth at a short distance from said source, said seismometer being positioned such that its electrical output signal essentially represents the radiated seismic signal after said near-surface distortions have occurred.

5. A seismic prospecting apparatus as recited in claim 1 in which said means for producing said first energy value comprises:

a. an analog multiplier circuit electrically connected to said near-field detector for producing an electrical signal proportional to the square of the output of said detector;

b. an analog digital converter circuit electrically connected to said analog multiplier circuit for the purpose of converting said squared electrical signal to equivalent electric signals in the form of digital numbers;

c. a summing register means connected to the output of said converter circuit for accumulating said digital numbers such that each successive digital number is added to the previously existing total of such numbers in the register;

d. a clock means connected to said analog digital converter and said summing register means for generating timing pulses to control the time intervals at which said near-field electrical signal is digitized and transferred to said summing register means, as well as the time intervals at which the squared digital number is added to the pre-existing total of said squared numbers; and e. means connected to said analog digital converter and said summing register means for resetting said analog converter and summing register for the purpose of clearing any remaining digital numbers preparatory to beginning a new energy value computation.

6. A seismic prospecting apparatus as recited in claim 3 in which said means for producing said first energy value comprises:

a. a full wave rectifier circuit electrically connected to said near-field detector for producing an absolute value electrical signal proportional to the absolute value of said near-field electrical signal;

b. an analog-digital converter circuit electrically connected to said full wave rectifier circuit for converting said absolute value electrical signal to electric signals equivalent to the digitized value of said absolute value;

c. a summing register means connected to said analog digital converter for accumulating said digitized values such that each successive absolute value digital number is added to the previously existing total of such numbers in the register;

d. a clock means connected to said analog digital converter and said summing register means for generating timing pulses to control the intervals at which said absolute value electrical signal is digitized, transferred to said summing register means and added to the pre-existing total of said absolute value numbers; and e. means connected to said analog digital converter and said summing register for resetting and clearing any remaining digital numbers preparatory to beginning a new energy value computation.

7. An improved seismic prospecting apparatus of the type having a controllable vibratory source which radiates a plurality of truncated sinusoids into the earth in response to electrical drive signals, wherein the improvement comprises:

a. means connected to said controllable vibratory source for generating said electric drive signals including circuitry for controlling the frequency, the beginning time and the ending time of each truncated sinusoid in response to external signals;

b. a frequency selection means connected to said signal generator means for establishing a current operating frequency;

c. a signal initiation means connected to said signal generator to supply a start pilot signal for starting said electrical drive signal at said current operating frequency;

d. a detecting means located near said controllable vibratory source for producing a near-field electrical signal corresponding to said radiated sinusoid after it has been distorted by the earth material adjacent to said source;

e. a tracking filter connected to said near-field detector for the purpose of attenuating harmonics and noise at frequencies other than said current operating frequency, said tracking filter also being connected to said signal generation means to receive said current operating frequency;

f. an analog multiplier circuit connected to said tracking filter for producing a signal proportional to the square of the output thereof;

g. an analog digital converter connected to said analog multiplier circuit for converting said squared near-field signal to a digitized electric signal proportional thereto;

h. an energy summing register connected to said analog digital converter to accumulate said squared digital values;

i. a first programmable storage unit for storing predetermined digital values as a function of frequency which represent a desired energy distribution;

j. a first logic unit connected to said first programmable storage unit and to said signal generation means for the purpose of determining an individual predetermined digital value corresponding to said current operating frequency;

k. a digital energy comparator connected to said first logic unit, said energy summing register, and said signal generation means for the purpose of generation a stop pilot signal when said cumulative squared digital value at least equals said predetermined digital value.

* * * * *